(12) United States Patent
Nakamura

(10) Patent No.: US 11,161,582 B2
(45) Date of Patent: Nov. 2, 2021

(54) HYBRID TYPE VESSEL PROPULSION APPARATUS

(71) Applicant: YAMAHA HATSUDOKI KABUSHIKI KAISHA, Iwata (JP)

(72) Inventor: Daisuke Nakamura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 349 days.

(21) Appl. No.: 16/535,190

(22) Filed: Aug. 8, 2019

(65) Prior Publication Data
US 2020/0062361 A1 Feb. 27, 2020

(30) Foreign Application Priority Data
Aug. 23, 2018 (JP) .............................. JP2018-156133

(51) Int. Cl.
*B63H 20/14* (2006.01)
*F16D 21/02* (2006.01)
(Continued)

(52) U.S. Cl.
CPC ............ *B63H 20/14* (2013.01); *B63H 21/20* (2013.01); *B63H 21/21* (2013.01); *B63H 23/30* (2013.01); *F16D 11/14* (2013.01); *F16D 21/02* (2013.01); *F16D 48/06* (2013.01); *B63H 21/213* (2013.01); *B63H 2021/202* (2013.01); *B63H 2021/205* (2013.01); *F16D 2500/1105* (2013.01); *F16D 2500/3067* (2013.01); *Y02T 70/5236* (2013.01)

(58) Field of Classification Search
None
See application file for complete search history.

(56) References Cited

U.S. PATENT DOCUMENTS

| 8,454,402 B1 | 6/2013 | Arbuckle et al. |
| 8,808,139 B1 * | 8/2014 | Arbuckle .............. B60W 10/02 477/5 |

(Continued)

FOREIGN PATENT DOCUMENTS

| EP | 1 897 801 A2 | 3/2008 |
| JP | 2017-218016 A | 12/2017 |
| WO | 2006/095042 A1 | 9/2006 |

OTHER PUBLICATIONS

EP search report (dated Dec. 10, 2019), EP19193134 (Year: 2019).*

*Primary Examiner* — Colby M Hansen
(74) *Attorney, Agent, or Firm* — Keating and Bennett, LLP

(57) ABSTRACT

A vessel propulsion apparatus includes a first transmission path that transmits the power of an engine to a propeller shaft, a second transmission path that transmits the power of a motor to the propeller shaft, and a controller. A first clutch cuts off the power transmission of the first transmission path in a first disconnection state, and permits the power transmission of the first transmission path in a first connection state. A second clutch cuts off the power transmission of the second transmission path in a second disconnection state, and permits the power transmission of the second transmission path in a second connection state. The controller executes tuning control of both the engine and the motor when the first clutch is switched between the first disconnection state and the first connection state and when the second clutch is switched between the second connection state and the second disconnection state.

11 Claims, 14 Drawing Sheets

(51) Int. Cl.
*F16D 48/06* (2006.01)
*B63H 23/30* (2006.01)
*B63H 21/21* (2006.01)
*B63H 21/20* (2006.01)
*F16D 11/14* (2006.01)

(56) References Cited

U.S. PATENT DOCUMENTS

| | | | |
|---|---|---|---|
| 2010/0248561 A1* | 9/2010 | Daikoku | B63H 20/10 440/3 |
| 2010/0311291 A1* | 12/2010 | Rolla | B63H 23/06 440/75 |
| 2017/0349256 A1 | 12/2017 | Nakamura | |

* cited by examiner

FIG. 8
in forward traveling

| Position of operation lever | | F3 | | | | | | F2 | | | | F1 | | N | |
|---|---|---|---|---|---|---|---|---|---|---|---|---|---|---|---|
| Engine | | ON | ↓ | ON | ↑ | OFF | ↓ | OFF | ↑ | OFF | ↓ | OFF | ↑ | OFF | ↓ |
| Electric motor | | Low speed | ↓ | Low speed | ↑ | Synchronization | ↓ | Synchronization | ↑ | START | ↓ | STOP | ↑ | Normal rotation | ↓ |
| | | | | | | | | | | Normal rotation | ↑ | Normal rotation | ↓ | Normal rotation | ↑ |
| First dog clutch | | F | ↓ | F | ↑ | N→F | ↓ | F→N | ↑ | N | ↓ | N | ↑ | N | ↓ |
| Second dog clutch | | OFF | ↓ | OFF | ↑ | ON→OFF | ↓ | OFF→ON | ↑ | ON | ↓ | ON | ↑ | ON | ↓ |
| Vessel operation mode | | EG forward movement | ↑ | EG forward movement | ↓ | Start of EG during EM forward movement & HV switching | ↑ | HV switching during EG forward movement & stop of EG | ↓ | EM forward movement | ↑ | EM forward movement | ↓ | Stop of vessel | ↑ |
| | | | | | | | | | | | | | | Stop of vessel | |

FIG. 9
In reverse traveling

| Position of operation lever | N | R1 | R2 | | R3 | |
|---|---|---|---|---|---|---|
| Engine | OFF → OFF → | OFF → OFF → | START ↓ STOP ↑ | | Low speed ↓ Low speed ↑ | ON ↓ ON ↑ |
| Electric motor | OFF ↓ OFF ↑ | Reverse rotation ↓ Reverse rotation ↑ | Reverse rotation ↓ Reverse rotation ↑ | | Synchronization ↓ Synchronization ↑ | OFF ↓ OFF ↑ |
| First dog clutch | N ↓ N ↑ | N ↓ N ↑ | N ↓ N ↑ | | N→R ↓ R→N ↑ | R ↓ R ↑ |
| Second dog clutch | ON ↓ ON ↑ | ON ↓ ON ↑ | ON ↓ ON ↑ | | ON→OFF ↓ OFF→ON ↑ | OFF ↓ OFF ↑ |
| Vessel operation mode | Stop of vessel ↓ Stop of vessel | EM reverse movement ↓ EM reverse movement | Start of EG during EM reverse movement & HV switching ↓ HV switching during EG reverse movement & stop of EG | | | EG reverse movement ↓ EG reverse movement |

HYBRID TYPE VESSEL PROPULSION APPARATUS

CROSS REFERENCE TO RELATED APPLICATIONS

This application claims the benefit of priority to Japanese Patent Application No. 2018-156133 filed on Aug. 23, 2018. The entire contents of this application are hereby incorporated herein by reference.

BACKGROUND OF THE INVENTION

1. Field of the Invention

The present invention relates to a hybrid type vessel propulsion apparatus that is powered by an engine and a motor such as an electric motor.

2. Description of the Related Art

A vessel propulsion apparatus disclosed in Japanese Patent Application Publication No. 2017-218016 includes an outboard motor and a suspension device by which the outboard motor is attached to a hull. The outboard motor includes a propeller and both an engine and an electric motor each of which generates power by which the propeller is rotated. The outboard motor includes a drive shaft that is rotationally driven by the engine, a pinion that rotates together with the drive shaft, a front gear and a rear gear that are rotationally driven by the pinion in mutually opposite directions, and a first dog clutch that selectively engages with the front gear and the rear gear. The outboard motor additionally includes an output shaft that is rotationally driven by the electric motor, a driving gear that rotates together with the output shaft, a driven gear that is rotationally driven by the driving gear, an intermediate ring that rotates together with the driven gear, and a second dog clutch that selectively engages with the intermediate ring. The outboard motor includes a shift slider that moves to any one of an intermediate position, a front position, and a rear position while being followed by the first dog clutch and the second dog clutch, and a shift actuator that moves the shift slider. The shift slider is movable in a front-rear direction with respect to a propeller shaft to which the propeller is attached, and the shift slider rotates together with the first dog clutch, the second dog clutch, and the propeller shaft.

When the shift slider is in the intermediate position, the first dog clutch is disengaged from both the front gear and the rear gear, and the second dog clutch engages with the intermediate ring. In this case, the power of the electric motor is transmitted to the propeller shaft through the intermediate ring and the second dog clutch, and therefore the propeller is rotated only by the power of the electric motor.

When the shift actuator moves the shift slider from the intermediate position to the front position, the first dog clutch engages with the front gear, and the second dog clutch is disengaged from the intermediate ring. Thus, the power of the engine is transmitted to the propeller shaft through the front gear and the first dog clutch, and therefore the propeller is rotated only by the power of the engine, and generates a thrust in a direction in which a hull is made to travel forward. When the shift actuator moves the shift slider from the front position toward the intermediate position, the first dog clutch is disengaged from the front gear, and the second dog clutch engages with the intermediate ring. Thus, the propeller is again rotated only by the power of the electric motor.

When the shift actuator moves the shift slider from the intermediate position to the rear position, the first dog clutch engages with the rear gear, and the second dog clutch is disengaged from the intermediate ring. Thus, the power of the engine is transmitted to the propeller shaft through the rear gear and the first dog clutch, and therefore the propeller is rotated only by the power of the engine, and generates a thrust in a direction in which the hull is made to travel in reverse. When the shift actuator moves the shift slider from the rear position toward the intermediate position, the first dog clutch is disengaged from the rear gear, and the second dog clutch engages with the intermediate ring. Thus, the propeller is again rotated only by the power of the electric motor.

In the vessel propulsion apparatus disclosed in Japanese Patent Application Publication No. 2017-218016, when the first dog clutch engages with the front gear or the rear gear or when the second dog clutch engages with the intermediate ring, i.e., when power switching is performed between the engine and the electric motor, there is a concern that shocks or noises will be caused by the engagement.

SUMMARY OF THE INVENTION

In order to overcome the previously unrecognized and unsolved challenges described above, preferred embodiments of the present invention provide hybrid type vessel propulsion apparatuses that each includes an engine, a motor, a propeller shaft that rotates together with a propeller, a first transmission path, a second transmission path, a first clutch, a second clutch, a switch, and a controller. The first transmission path transmits power of the engine to the propeller shaft. The second transmission path transmits power of the motor to the propeller shaft without transmitting the power of the motor through the first transmission path. The first clutch includes a first disconnection state in which power transmission of the first transmission path is cut off and a first connection state in which the power transmission of the first transmission path is permitted. The second clutch includes a second disconnection state in which power transmission of the second transmission path is cut off and a second connection state in which the power transmission of the second transmission path is permitted. The switch switches the first clutch from the first disconnection state to the first connection state, and switches the second clutch from the second connection state to the second disconnection state. The switch switches the first clutch from the first connection state to the first disconnection state, and switches the second clutch from the second disconnection state to the second connection state. The controller is configured or programmed to execute tuning control of both the engine and the motor when the switch switches the first clutch between the first disconnection state and the first connection state and switches the second clutch between the second connection state and the second disconnection state. With respect to the tuning control, an engine conversion rotation speed is calculated by converting the rotation speed of the engine into the rotation speed of the propeller shaft, and a motor conversion rotation speed is calculated by converting the rotation speed of the motor into the rotation speed of the propeller shaft. The tuning control is a control operation that reduces a difference between the absolute value of the engine conversion rotation speed and the absolute value of the motor conversion rotation speed. The tuning control enables a difference between the absolute value of the engine conversion rotation speed and the absolute value of the motor conversion rotation speed to become larger than zero and become equal to or less than a predetermined upper limit value. The controller starts the tuning control in a state in which the absolute value of the engine conversion rotation speed is larger than the absolute value of the motor conversion rotation speed.

According to this structural arrangement, the power source of the hybrid type vessel propulsion apparatus is switched from the motor to the engine when the switch switches the first clutch from the first disconnection state to the first connection state, and switches the second clutch from the second connection state to the second disconnection state. The mode of the hybrid type vessel propulsion apparatus at this time is referred to as an engine drive mode. The power source of the hybrid type vessel propulsion apparatus is switched from the engine to the motor when the switch switches the first clutch from the first connection state to the first disconnection state, and switches the second clutch from the second disconnection state to the second connection state. The mode of the hybrid type vessel propulsion apparatus at this time is referred to as a motor drive mode. The tuning control of both the engine and the motor is executed when the hybrid type vessel propulsion apparatus is switched between the engine drive mode and the motor drive mode. In other words, the tuning control is executed so as to be in a state in which there is substantially no difference between the absolute value of the engine conversion rotation speed and the absolute value of the motor conversion rotation speed, and, in this state, the hybrid type vessel propulsion apparatus is switched between the engine drive mode and the motor drive mode. Thus, the power of the hybrid type vessel propulsion apparatus is switched between the engine and the motor. Therefore, when power switching is performed, it is possible to reduce a shock or a noise that results from the magnitude of a difference between the engine conversion rotation speed and the motor conversion rotation speed. Particularly in a state in which the absolute value of the engine conversion rotation speed is larger than the absolute value of the motor conversion rotation speed, the tuning control is started, and therefore it is possible to perform power switching in a state in which vibrations caused by the engine have been reduced by the fact that the absolute value of the engine conversion rotation speed becomes smaller after the tuning control is started. This makes it possible to further reduce a shock or a noise caused when power switching is performed. This effect is obtained not only in a case in which the engine conversion rotation speed and the motor conversion rotation speed are both positive values, and the engine conversion rotation speed is higher than the motor conversion rotation speed but also in a case in which the motor conversion rotation speed is higher than the engine conversion rotation speed. A case in which the motor conversion rotation speed is higher than the engine conversion rotation speed is a case in which the motor conversion rotation speed is a positive value, and the engine conversion rotation speed is a negative value.

In a preferred embodiment of the present invention, the controller is configured or programmed to execute the tuning control when the switch switches the first clutch from the first disconnection state to the first connection state, and switches the second clutch from the second connection state to the second disconnection state. According to this structural arrangement, it is possible to reduce a shock or a noise caused when power switching is performed from the motor drive mode to the engine drive mode in the hybrid type vessel propulsion apparatus.

In a preferred embodiment of the present invention, the controller is configured or programmed to execute the tuning control when the switch switches the first clutch from the first connection state to the first disconnection state, and switches the second clutch from the second disconnection state to the second connection state. According to this structural arrangement, it is possible to reduce a shock or a noise caused when power switching is performed from the engine drive mode to the motor drive mode in the hybrid type vessel propulsion apparatus.

In a preferred embodiment of the present invention, the controller is configured or programmed to execute the tuning control so that the engine conversion rotation speed temporarily becomes lower than the motor conversion rotation speed. According to this structural arrangement, in the tuning control, the engine conversion rotation speed decreases until the engine conversion rotation speed becomes lower than the motor conversion rotation speed, and, as a result, power switching is performed in a state in which vibrations caused by the engine have been reduced. Therefore, it is possible to further reduce a shock or a noise caused when power switching is performed.

In a preferred embodiment of the present invention, the controller executes the tuning control so that the engine conversion rotation speed temporarily becomes lower than the motor conversion rotation speed, and then increases. According to this structural arrangement, the engine conversion rotation speed temporarily becomes lower than the motor conversion rotation speed, and then increases, and, as a result, a difference between the absolute value of the engine conversion rotation speed and the absolute value of the motor conversion rotation speed becomes substantially zero. In this state, power switching is performed, thus making it possible to reliably reduce a shock or a noise caused when power switching is performed.

In a preferred embodiment of the present invention, the controller executes the tuning control so that the motor conversion rotation speed temporarily becomes higher than the engine conversion rotation speed, and then decreases. According to this structural arrangement, the engine conversion rotation speed becomes lower than the motor conversion rotation speed, and, accordingly, the motor conversion rotation speed becomes higher than the engine conversion rotation speed, and yet, thereafter, the motor conversion rotation speed decreases. As a result, a difference between the absolute value of the engine conversion rotation speed and the absolute value of the motor conversion rotation speed becomes substantially zero. In this state, power switching is performed, thus making it possible to reliably reduce a shock or a noise caused when power switching is performed.

In a preferred embodiment of the present invention, the controller may be configured or programmed to keep the motor conversion rotation speed constant during a period until the engine conversion rotation speed decreases and temporarily coincides with the motor conversion rotation speed after the tuning control is started. According to this structural arrangement, the motor conversion rotation speed is constant, and therefore the controller easily controls the absolute value of the engine conversion rotation speed so as to approach the absolute value of the motor conversion rotation speed.

In a preferred embodiment of the present invention, the controller may increase the motor conversion rotation speed during a period until the engine conversion rotation speed decreases and temporarily coincides with the motor conversion rotation speed after the tuning control is started.

According to this structural arrangement, the motor conversion rotation speed increases while the engine conversion rotation speed decreases, and therefore a difference between the absolute value of the engine conversion rotation speed and the absolute value of the motor conversion rotation speed swiftly becomes small. This makes it possible to swiftly perform power switching while reducing a shock or a noise caused when power switching is performed.

In a preferred embodiment of the present invention, the first transmission path includes a first driving gear that rotates in accordance with rotation of the engine and a first driven gear that is rotationally driven by the first driving gear. The first clutch includes a first dog clutch that is movable in an axial direction of the propeller shaft between a first disconnection position disengaged from the first driven gear and a first connection position engaged with the first driven gear and that rotates together with the propeller shaft. The first clutch is in the first disconnection state when the first dog clutch is located at the first disconnection position and the first clutch is in the first connection state when the first dog clutch is located at the first connection position. The second transmission path includes a second driving gear that rotates in accordance with rotation of the motor and a second driven gear that is rotationally driven by the second driving gear. The second clutch includes a second dog clutch that is movable in the axial direction between a second disconnection position disengaged from the second driven gear and a second connection position engaged with the second driven gear and that rotates together with the propeller shaft. The second clutch is in the second disconnection state when the second dog clutch is located at the second disconnection position and the second clutch is in the second connection state when the second dog clutch is located at the second connection position. The switch includes a shift actuator that moves the first dog clutch and the second dog clutch in the axial direction. The engine conversion rotation speed is equal or substantially equal to a rotation speed of the first driven gear, and the motor conversion rotation speed is equal or substantially equal to a rotation speed of the second driven gear.

According to this structural arrangement, the first dog clutch and the second dog clutch rotate together with the propeller shaft. When the first dog clutch is connected to the first driven gear that rotates while receiving the power of the engine and when the second dog clutch is disconnected from the second driven gear that rotates while receiving the power of the motor, the hybrid type vessel propulsion apparatus enters the engine drive mode. When the first dog clutch is disconnected from the first driven gear and when the second dog clutch is connected to the second driven gear, the hybrid type vessel propulsion apparatus enters the motor drive mode. When the drive mode is switched to either the engine drive mode or the motor drive mode in this way, a difference between the absolute value of the rotation speed of the first driven gear and the absolute value of the rotation speed of the second driven gear becomes larger than zero and becomes equal to or less than a predetermined upper limit value by performing the tuning control operation. This makes it possible to reduce a shock or a noise caused when the first dog clutch is connected to the first driven gear to switch to the engine drive mode or when the second dog clutch is connected to the second driven gear to switch to the motor drive mode.

In a preferred embodiment of the present invention, the motor may be an electric motor or may be an oil motor.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a table showing a relationship between the position of an operation lever and operations of an engine, etc., when the operation lever is forwardly tilted.

FIG. 9 is a table showing a relationship between the position of the operation lever and operations of the engine, etc., when the operation lever is rearwardly tilted.

DETAILED DESCRIPTION OF THE PREFERRED EMBODIMENTS

Preferred embodiments of the present invention will be hereinafter described in detail with reference to the accompanying drawings.

First Preferred Embodiment

Figure 1:
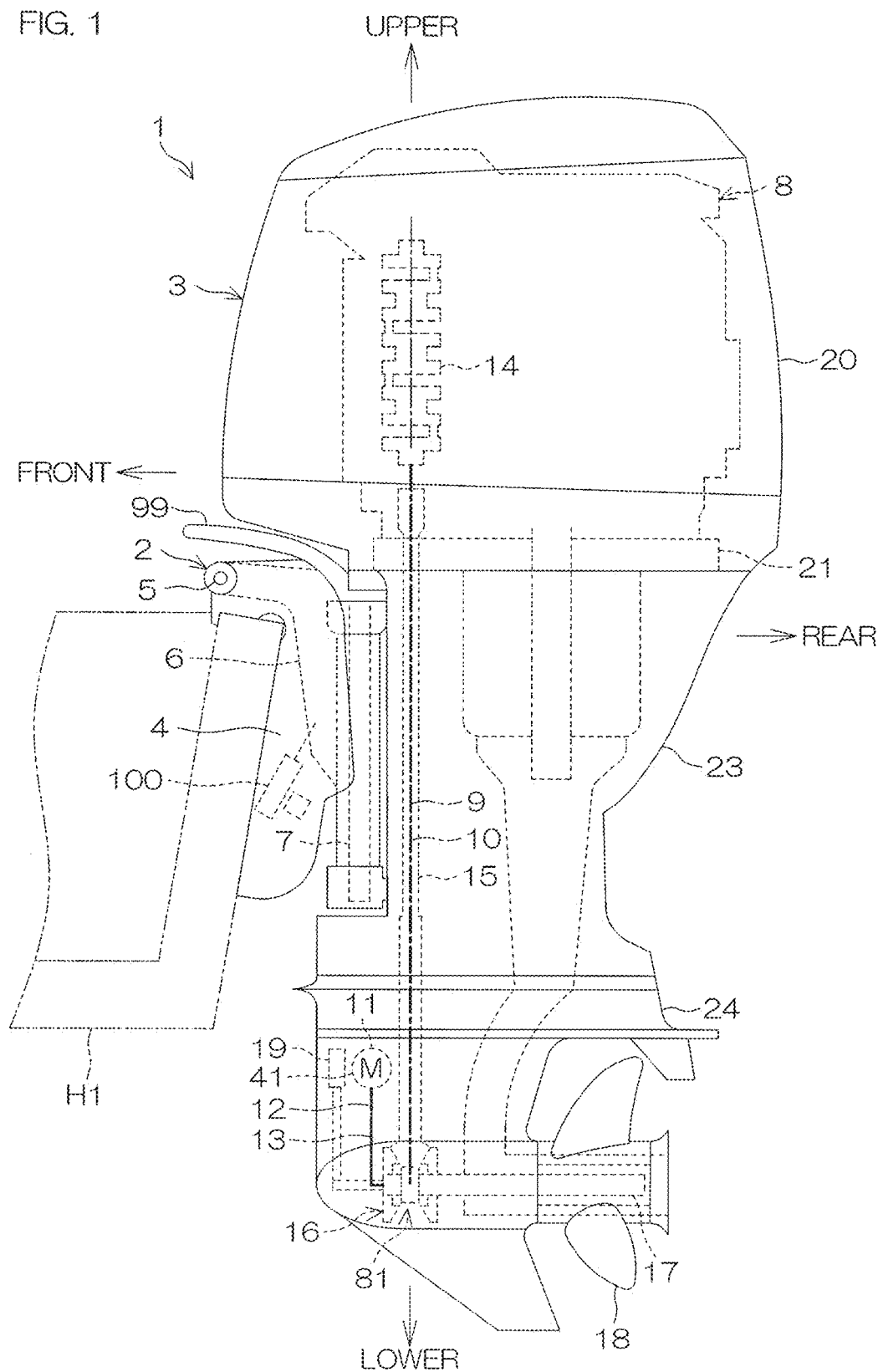
FIG. 1 is a schematic left side view showing a vessel propulsion apparatus according to a first preferred embodiment of the present invention.

FIG. 1 is a schematic left side view showing a vessel propulsion apparatus 1 according to a first preferred embodiment of the present invention. The vessel propulsion apparatus 1 being in a basic posture will be described below. The basic posture is a posture in which a rotational axis of an engine 8 (i.e., a rotational axis of a crankshaft 14) extends in a vertical direction and in which a rotational axis of a propeller shaft 17 perpendicular to the rotational axis of the engine 8 extends in a front-rear direction.

A vessel includes a hull H1 that floats on a water surface and the vessel propulsion apparatus 1 that propels the hull H1. The vessel propulsion apparatus 1 includes an outboard motor 3 that generates a thrust and a suspension device 2 by which the outboard motor 3 is attached to a rear portion of the hull H1. The vessel propulsion apparatus 1 additionally includes a steering device 99 that turns the outboard motor 3 rightwardly and leftwardly with respect to the hull H1 and a tilt device 100 that turns the outboard motor 3 upwardly and downwardly with respect to the hull H1.

The suspension device 2 includes a clamp bracket 4 that is attachable to a stern, a swivel bracket 6 that is held by the clamp bracket 4, and a steering shaft 7 that is held by the swivel bracket 6. The swivel bracket 6 is rotatable around a tilting shaft 5 extending in a right-left direction with respect to the clamp bracket 4. The steering shaft 7 extends in an up-down direction, and is rotatable around its axis with respect to the swivel bracket 6.

The outboard motor 3 is disposed behind the hull H1. The outboard motor 3 is connected to an upper end portion and a lower end portion of the steering shaft 7 through an upper mount member and a lower mount member. The outboard motor 3 rotates around the steering shaft 7 together with the steering shaft 7. The outboard motor 3 is rotatable around the steering shaft 7 with respect to the hull H1, and is rotatable around the tilting shaft 5 with respect to the hull H1.

The outboard motor 3 includes a first powertrain including the engine 8 and a second powertrain including an electric motor 11 as an example of a motor. The engine 8 and the electric motor 11 are each an example of a prime mover that generates power by which a propeller 18 is rotated. Therefore, the vessel propulsion apparatus 1 is a hybrid type vessel propulsion apparatus. The rotational power of the engine 8 is transmitted to the propeller 18 through the propeller shaft 17. Likewise, the rotational power of the electric motor 11 is transmitted to the propeller 18 through the propeller shaft 17. In other words, the propeller shaft 17 is shared between the first and second powertrains.

The first powertrain includes a first transmission member 10 that defines a first transmission path 9 that extends from the engine 8 to the propeller shaft 17 in addition to the engine 8 and the propeller shaft 17. The second powertrain includes a second transmission member 13 that defines a second transmission path 12 that extends from the electric motor 11 to the propeller shaft 17 in addition to the electric motor 11 and the propeller shaft 17.

The first transmission path 9 and the second transmission path 12 are mutually-independent parallel paths. An upstream end of the first transmission path 9 is connected to the engine 8, and a downstream end of the first transmission path 9 is connected to the propeller shaft 17 in the outboard motor 3. An upstream end of the second transmission path 12 is connected to the electric motor 11, and a downstream end of the second transmission path 12 is connected to the propeller shaft 17 in the outboard motor 3. Both the first transmission path 9 and the second transmission path 12 are spaced apart from each other from the engine 8 and the electric motor 11 to the propeller shaft 17. The first transmission path 9 transmits the power of the engine 8 to the propeller shaft 17. The second transmission path 12 transmits the power of the electric motor 11 to the propeller shaft 17 without transmitting the power of the electric motor 11 through the first transmission path 9.

The outboard motor 3 includes a casing that houses the first and second powertrains. The casing includes a cowl 20 that houses the engine 8, an exhaust guide 21 that is disposed under the engine 8, an upper case 23 that is disposed under the exhaust guide 21, and a lower case 24 that is disposed under the upper case 23. The engine 8 is disposed on the exhaust guide 21. The electric motor 11 is disposed inside the lower case 24.

The first transmission member 10 includes a drive shaft 15 that extends in the up-down direction under the engine 8 and a forward-reverse switching mechanism 16 that is connected to a lower end portion of the drive shaft 15. The drive shaft 15 is disposed in the upper case 23 and the lower case 24. The forward-reverse switching mechanism 16 and the propeller shaft 17 are disposed in the lower case 24. The propeller shaft 17 extends in the front-rear direction in the lower case 24. The propeller 18 is attached to a rear end portion of the propeller shaft 17, and is disposed behind the lower case 24. The propeller 18 rotates in a forward rotation direction or in a reverse rotation direction together with the propeller shaft 17.

The engine 8 rotates the drive shaft 15 in a predetermined rotation direction. The forward-reverse switching mechanism 16 performs switching between a forward state in which the rotation in the forward rotation direction is transmitted from the drive shaft 15 to the propeller shaft 17 and a reverse state in which the rotation in the reverse rotation direction is transmitted from the drive shaft 15 to the propeller shaft 17. The forward-reverse switching mechanism 16 also shifts to a neutral state in which the transmission of the rotation from the drive shaft 15 to the propeller shaft 17 is cut off. A shift device 19 of the outboard motor 3 shifts the state of the forward-reverse switching mechanism 16 to the other state, and thus shifts the direction of the rotation transmitted from the engine 8 to the propeller 18 to the other direction.

Figure 2:
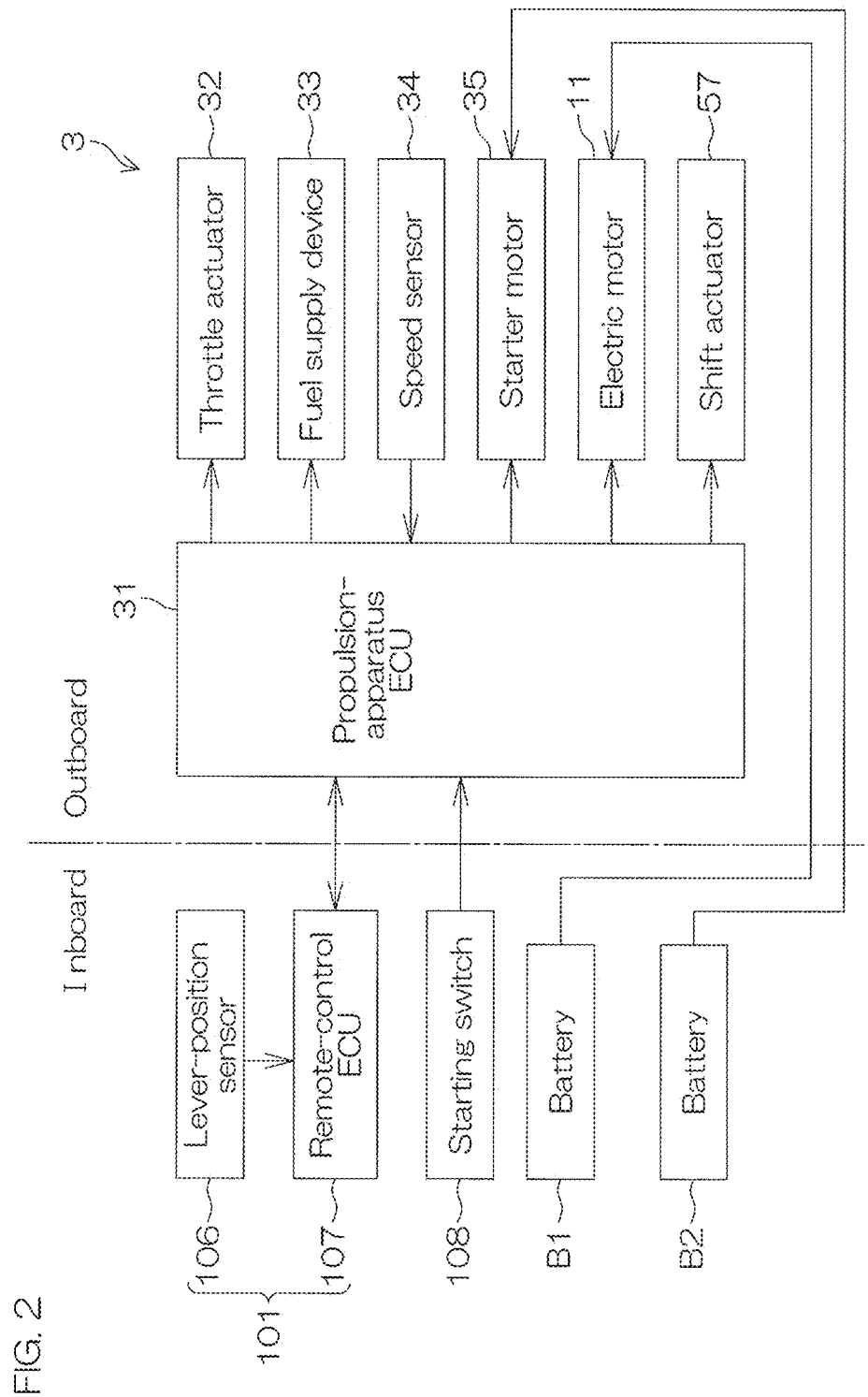
FIG. 2 is a block diagram showing an electrical configuration of the vessel propulsion apparatus.

FIG. 2 is a block diagram showing an electrical configuration of the vessel propulsion apparatus 1. The outboard motor 3 includes a propulsion-apparatus ECU 31, a throttle actuator 32 that changes the opening degree of a throttle valve that changes the flow rate of air supplied to a combustion chamber, and a fuel supply device 33 that changes the flow rate of fuel supplied to the combustion chamber. The propulsion-apparatus ECU (Electronic Control Unit) 31 is an example of a controller that controls the vessel propulsion apparatus 1. The propulsion-apparatus ECU 31 changes the output of the engine 8 by controlling the throttle actuator 32 and the fuel supply device 33. The rotation speed of the engine 8 (i.e., the rotation speed of the crankshaft 14) is detected by a speed sensor 34. The rotation speed of the electric motor 11 is detected by another speed sensor (not shown), and is input into the propulsion-apparatus ECU 31. The propulsion-apparatus ECU 31 allows a starter motor 35 located in the cowl 20 to start the engine 8.

The vessel propulsion apparatus 1 includes a remote control unit 101 that is operated by a user when switching between the forward traveling and the reverse traveling of the vessel and when adjusting the output of the vessel propulsion apparatus 1, and includes a starting switch 108 that is operated by the user when the vessel propulsion apparatus 1 is started. The remote control unit 101 and the starting switch 108 are disposed on the hull H1. The operation of the remote control unit 101 and the operation of the starting switch 108 performed by the user are electrically transmitted to the propulsion-apparatus ECU 31 in a wireless or wired manner.

Figure 3:
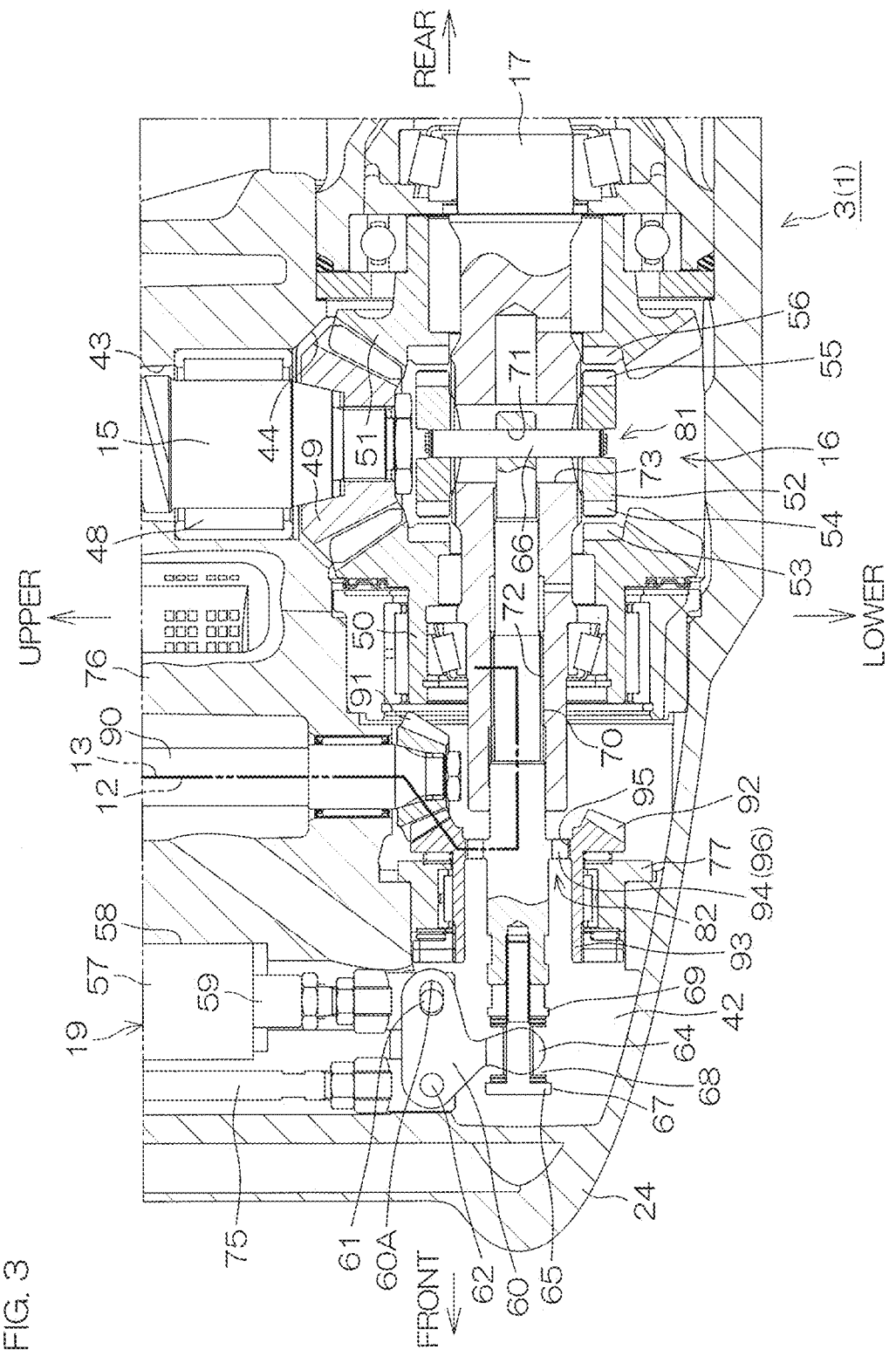
FIG. 3 is a cross-sectional view showing a portion of a vertical cross section of a lower unit of an outboard motor.
Figure 4:
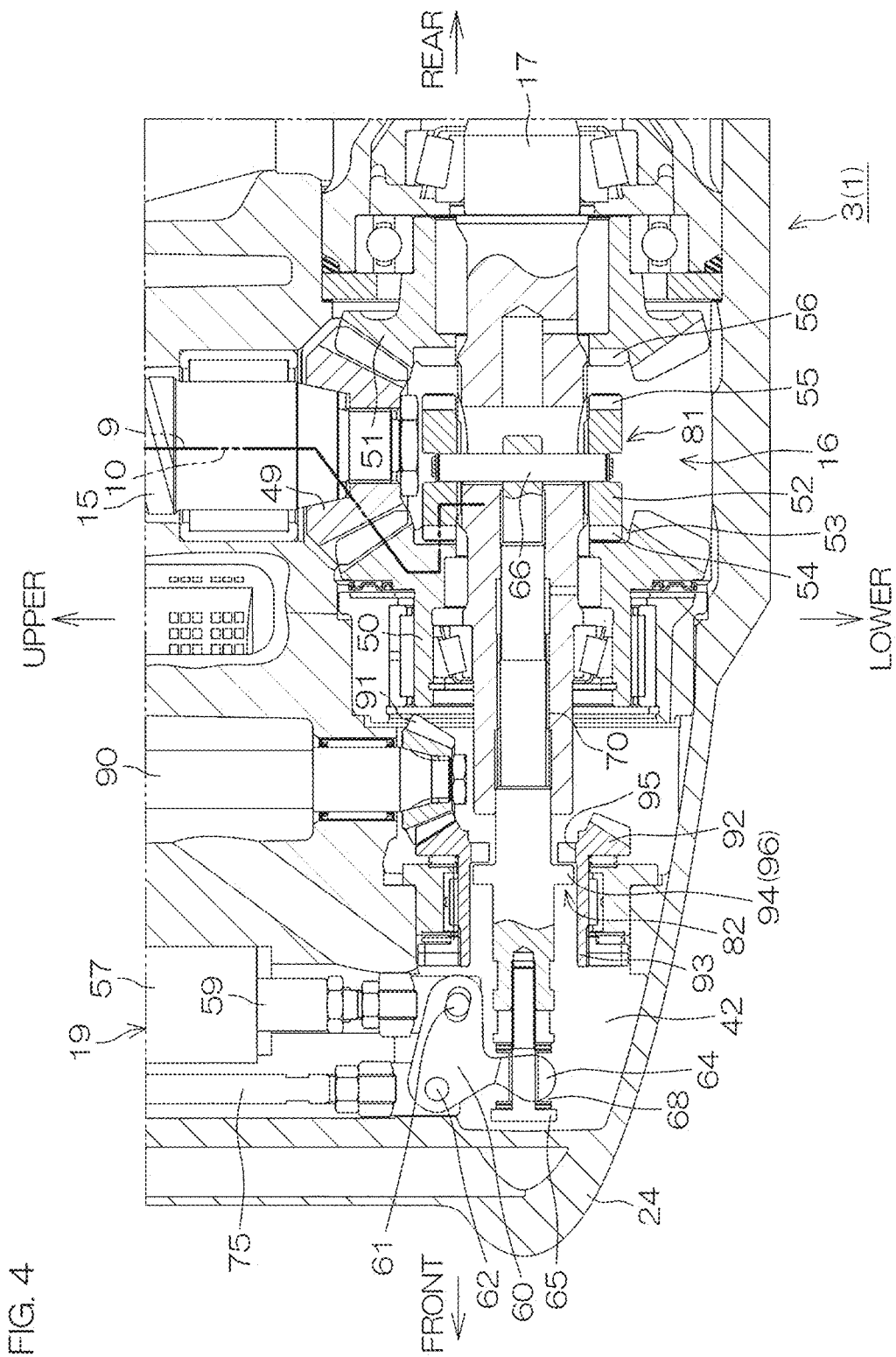
FIG. 4 is a cross-sectional view showing a portion of a vertical cross section of the lower unit of the outboard motor.
Figure 5:
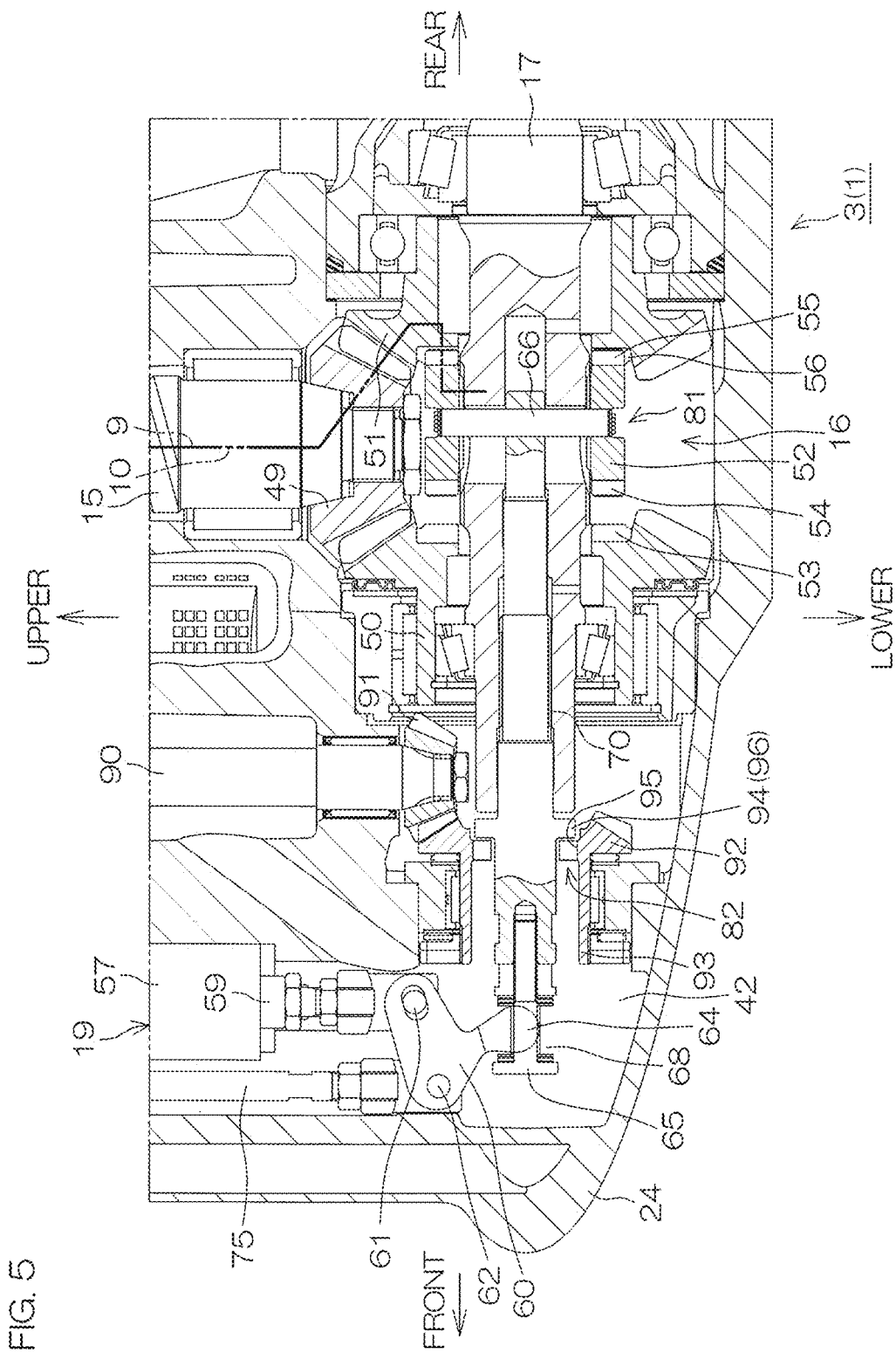
FIG. 5 is a cross-sectional view showing a portion of a vertical cross section of the lower unit of the outboard motor.

FIG. 3, FIG. 4, and FIG. 5 are cross-sectional views, each showing a portion of a vertical cross section of a lower unit of the outboard motor 3, and depict mutually-different states. As shown in FIG. 3, the lower case 24 defines a first housing chamber in which the first powertrain is housed and a second housing chamber in which the second powertrain is housed. The first housing chamber includes a shaft insertion hole 43 in which the drive shaft 15 is inserted and a gear chamber 44 in which the forward-reverse switching mechanism 16 is disposed. The second housing chamber includes a motor chamber 41 (see FIG. 1) in which the electric motor 11 is disposed and a shift chamber 42 in which a front end portion of a shift slider 65 described below is disposed.

The shaft insertion hole 43 extends upwardly from the gear chamber 44, and the motor chamber 41 extends upwardly from the shift chamber 42. The shaft insertion hole 43 and the motor chamber 41 are spaced apart from each other in the front-rear direction, and the gear chamber 44 and the shift chamber 42 are connected together. The shift chamber 42 is separated from the motor chamber 41 by a spacer (not shown). Lubricating oil is stored in the shaft insertion hole 43, in the gear chamber 44, and in the shift chamber 42.

The forward-reverse switching mechanism 16 includes a pinion 49 that rotates together with the drive shaft 15, a front gear 50 that is rotationally driven by the pinion 49, and a rear gear 51 that is rotationally driven by the pinion 49 in a direction opposite to the front gear 50. The forward-reverse switching mechanism 16 additionally includes a first dog clutch 52 that is movable between a first connection position to engage with one of the front and rear gears 50 and 51 and a first cut-off position to disengage from both the front gear 50 and the rear gear 51. The pinion 49 is an example of a first drive gear, and the front gear 50 and the rear gear 51 are each an example of a first driven gear.

The pinion 49, the front gear 50, and the rear gear 51 are respectively bevel gears. The pinion 49 is coaxial with the drive shaft 15, and the front gear 50 and the rear gear 51 are coaxial with the propeller shaft 17. The front gear 50 and the rear gear 51 surround the propeller shaft 17, and are rotatably supported by the lower case 24. The front gear 50 and the rear gear 51 face each other in the front-rear direction with an interval between the front gear 50 and the rear gear 51.

The first dog clutch 52 is disposed between the front gear 50 and the rear gear 51. The first dog clutch 52 is positioned below the pinion 49. The first dog clutch 52 preferably has a cylindrical shape that surrounds the propeller shaft 17. The first dog clutch 52 is joined with the propeller shaft 17 by a spline that extends in the front-rear direction. The first dog clutch 52 is movable in the front-rear direction with respect to the propeller shaft 17, and is rotatable together with the propeller shaft 17.

As shown in FIG. 4 and FIG. 5, the first dog clutch 52 includes a plurality of front convex portions 54 that respectively engage with a plurality of front concave portions 53 of the front gear 50 and a plurality of rear convex portions 55 that respectively with engage with a plurality of rear concave portions 56 of the rear gear 51. The plurality of front convex portions 54 are disposed at equal intervals in a circumferential direction of the first dog clutch 52, and extend in the front-rear direction that corresponds to an axial direction of the propeller shaft 17 and to that of the first dog clutch 52. The same applies to the plurality of the rear convex portions 55 as the plurality of front convex portions 54. The first dog clutch 52, the front concave portion 53, and the rear concave portion 56 are included in a first clutch 81.

The first dog clutch 52 is located at any one of a forward position (a position shown in FIG. 4), a neutral position (a position shown in FIG. 3), and a reverse position (a position shown in FIG. 5). The forward position is a position at which the first dog clutch 52 engages with the front gear 50 and rotates together with the front gear 50. The reverse position is a position at which the first dog clutch 52 engages with the rear gear 51 and rotates together with the rear gear 51. The neutral position is a position at which the first dog clutch 52 is disengaged from the front and rear gears 50 and 51 and at which the transmission of rotation from the drive shaft 15 to the propeller shaft 17 is cut off. The neutral position is a first disconnection position at which the power transmission of the first transmission path 9 is cut off, and the forward position and the reverse position are first connection positions, respectively, at which the power transmission of the first transmission path 9 is permitted. When the first dog clutch 52 is located at the neutral position, the first clutch 81 is in a first disconnection state. When the first dog clutch 52 is located at the first connection position, the first clutch 81 is in a first connection state.

As shown in FIG. 3, the shift device 19 includes a shift actuator 57 that generates power by which the state of the forward-reverse switching mechanism 16 is switched and a shift slider 65 that moves in the front-rear direction together with the first dog clutch 52. The shift device 19 includes a pusher 64 that pushes the shift slider 65 in the front-rear direction and a link arm 60 that transmits the power of the shift actuator 57 to the pusher 64 and that has the shape of the letter L in a lateral view. The shift device 19 additionally includes a connection pin 66 by which the first dog clutch 52 and the shift slider 65 are connected together. The shift device 19 is an example of a switch.

At least one portion of the shift actuator 57 is disposed in the lower case 24. The shift actuator 57 includes a shift rod 59 that is movable in an axial direction, a shift motor that generates power by which the shift rod 59 is moved in its axial direction, and a ball screw and a ball nut both of which convert the rotation of the shift motor into a rectilinear motion of the shift rod 59. The shift actuator 57 includes a shift housing 58 in which the shift motor, the ball screw, and the ball nut are housed.

The shift housing 58 is fixed to the lower case 24 through the aforementioned spacer. The shift rod 59 protrudes downwardly from the shift housing 58. The shift rod 59 extending in the up-down direction is parallel to the drive shaft 15. When the shift motor rotates its output shaft, the ball nut and the ball screw relatively rotate, and the shift rod 59 moves in the axial direction of the shift rod 59 with respect to the shift housing 58. Thus, the amount of protrusion of the shift rod 59 from the shift housing 58 changes.

The shift slider 65 extends in the front-rear direction in the lower case 24. The shift slider 65 is coaxial with the propeller shaft 17. A portion of the shift slider 65 is positioned in front of the propeller shaft 17. The shift slider 65 includes a spline portion 70 having its outer periphery on which a plurality of teeth extending in the front-rear direction are provided. The spline portion 70 is inserted in a center hole 72 of the propeller shaft 17 that extends rearwardly from a front end portion of the propeller shaft 17. The shift slider 65 is spline-coupled to the propeller shaft 17. The shift slider 65 is movable in the front-rear direction with respect to the propeller shaft 17, and is rotatable together with the propeller shaft 17.

The connection pin 66 is inserted in a through-hole 73 passing through the propeller shaft 17 in the radial direction of the propeller shaft 17. A rear end portion of the shift slider 65 is disposed in the through-hole 73. The connection pin 66 is inserted in an insertion hole 71 of the shift slider 65 in the through-hole 73. Both end portions of the connection pin 66 are connected to the first dog clutch 52 surrounding the through-hole 73. The connection pin 66 is movable in the front-rear direction in the through-hole 73. The connection pin 66 is movable in the front-rear direction with respect to the propeller shaft 17 together with the first dog clutch 52 and the shift slider 65, and is rotatable together with the first dog clutch 52, the shift slider 65, and the propeller shaft 17.

The link arm 60 includes a first end portion that is connected to the shift rod 59 through a pin 61 that extends in the right-left direction, a second end portion that is connected to the pusher 64, and an intermediate portion that is connected to a holder 75 through an intermediate pin 62 that extends in the right-left direction. The pin 61 is held by the shift rod 59. The pin 61 is fitted in a long hole 60A provided in the first end portion of the link arm 60 with a forward-rearward clearance. The holder 75 extends downwardly from the aforementioned spacer, and is fixed to the lower case 24 through the spacer. The link arm 60 is rotatable around the center line of the intermediate pin 62 with respect to the holder 75.

When the shift rod 59 moves in the up-down direction, the first end portion of the link arm 60 is pushed upwardly or downwardly, and turns in the up-down direction around the center line of the intermediate pin 62. Accordingly, the second end portion of the link arm 60 turns in the front-rear direction around the center line of the intermediate pin 62. Thus, the pusher 64 is pushed forwardly or rearwardly.

The pusher 64 is inserted in an annular groove 68 that surrounds the shift slider 65 around the center line of the shift slider 65. The shift slider 65 includes an annular front facing portion 67 and an annular rear facing portion 69 both of which define a side surface of the annular groove 68. The front facing portion 67 is disposed in front of the pusher 64, and the rear facing portion 69 is disposed behind the pusher 64. The front facing portion 67 and the rear facing portion 69 face the pusher 64 even when the shift slider 65 has any rotation angle. When the pusher 64 moves forwardly, the front facing portion 67 is pushed forwardly, and the shift slider 65 moves forwardly. On the contrary, when the pusher 64 moves rearwardly, the rear facing portion 69 is pushed rearwardly, and the shift slider 65 moves rearwardly.

Next, the second powertrain that includes the electric motor 11 will be described.

The electric motor 11 is disposed in front of the drive shaft 15. The drive shaft 15 is rotatably supported by the lower case 24 through, for example, a bearing 48 positioned above the pinion 49.

The electric motor 11 is, for example, a stepping motor, and is fixed to the lower case 24. The electric motor 11 includes an output shaft that extends parallel to the drive shaft 15 and that protrudes downwardly.

The second transmission member 13 includes a deceleration mechanism that decelerates and transmits the rotation of the electric motor 11 (the rotation of the above-described output shaft) and an intermediate shaft 90 that transmits the rotation decelerated and transmitted by the deceleration mechanism to the propeller shaft 17. The second transmission member 13 additionally includes a second drive gear 91 that rotates together with the intermediate shaft 90 and a second driven gear 92 that is rotationally driven by the second drive gear 91. The second transmission member 13 additionally includes an intermediate ring 93 that rotates together with the second driven gear 92 and the shift slider 65 that is surrounded by the second driven gear 92 and the intermediate ring 93. The shift slider 65 is shared between the second transmission member 13 and the shift device 19.

The deceleration mechanism includes, for example, a planetary gear mechanism, and is connected to the output shaft of the electric motor 11 and the intermediate shaft 90.

When the electric motor 11 rotates the output shaft, the rotation of the electric motor 11 is decelerated by the deceleration mechanism, and is transmitted to the intermediate shaft 90.

The intermediate shaft 90 is coaxial with the electric motor 11. The intermediate shaft 90 may be eccentric with respect to the electric motor 11. The intermediate shaft 90 extends downwardly from the deceleration mechanism. The intermediate shaft 90 is parallel or substantially parallel to the drive shaft 15. The intermediate shaft 90 is disposed in a cylindrical shaft housing 76 fixed to the lower case 24. The intermediate shaft 90 is connected to the second drive gear 91. The second drive gear 91 is fixed to a lower end of the intermediate shaft 90. The intermediate shaft 90 and the second drive gear 91 are rotatable with respect to the shaft housing 76.

The second driving gear 91 and the second driven gear 92 are bevel gears, respectively. The second driving gear 91 is positioned above the shift slider 65. The second driven gear 92 is positioned in front of the propeller shaft 17. The second driven gear 92 is coaxial with the shift slider 65, and surrounds the shift slider 65 with an interval in the radial direction of the shift slider 65. The second driven gear 92 is spaced apart from the shift slider 65. The second driven gear 92 is located at a more forward position than a rotational axis of the second driving gear 91. The second driven gear 92 may be located at a more rearward position than the rotational axis of the second driving gear 91.

The intermediate ring 93 is coaxial with the shift slider 65, and surrounds the shift slider 65. The intermediate ring 93 and the second driven gear 92 are a single integral member. The intermediate ring 93 may be a member that is fixed to the second driven gear 92 and that differs from the second driven gear 92. In any case, the intermediate ring 93 may be regarded as a portion of the second driven gear 92. The intermediate ring 93 extends forwardly from the second driven gear 92. The intermediate ring 93 is rotatably supported by the lower case 24 through a bearing and an adapter 77.

The second transmission member 13 includes a second clutch 82 that is switched between a second connection state in which the intermediate ring 93 rotates together with the shift slider 65 and a second disconnection state in which the intermediate ring 93 and the shift slider 65 are disconnected from each other. The second clutch 82 includes a second dog clutch 94 that is movable in the front-rear direction between a second connection position to engage with the intermediate ring 93 and a second disconnection position to be disengaged from the intermediate ring 93.

FIG. 3 shows an example in which the second dog clutch 94 and the shift slider 65 are a single integral member. The second dog clutch 94 may be a member that is fixed to the shift slider 65 and that differs from the shift slider 65. The shift slider 65 is rotatable together with the propeller shaft 17, and therefore the second dog clutch 94 is also rotatable together with the propeller shaft 17.

As shown in FIG. 4 and FIG. 5, the second dog clutch 94 includes a plurality of convex portions 96 that respectively engage with a plurality of concave portions 95 of the intermediate ring 93. The plurality of convex portions 96 are disposed at equal intervals in a circumferential direction of the second dog clutch 94. The plurality of convex portions 96 protrude outwardly in a radial direction of the second dog clutch 94 from the shift slider 65. The plurality of concave portions 95 are concaved outwardly in the radial direction of the second dog clutch 94 from an inner peripheral surface of the intermediate ring 93. The plurality of concave portions 95 are disposed at equal intervals in the circumferential direction of the second dog clutch 94. The convex portion 96 and the concave portion 95 are positioned between the annular groove 68 and the spline portion 70 in the front-rear direction.

The second dog clutch 94 is located at any one of a front disconnection position (a position shown in FIG. 4), the second connection position (a position shown in FIG. 3), and a rear disconnection position (a position shown in FIG. 5). Each of the front and rear disconnection positions is the above-described second disconnection position. When the second dog clutch 94 moves to the second connection position, each of the convex portions 96 is fitted into its corresponding concave portion 95. Thus, the second clutch 82 is switched from the second disconnection state to the second connection state. In the second connection state, the rotation of the electric motor 11 is transmitted between the intermediate ring 93 and the shift slider 65 without generating a slip. In other words, the second clutch 82 being in the second connection state permits the power transmission of the second transmission path 12.

When the second dog clutch 94 moves to the second disconnection position, each convex portion 96 is disengaged from its corresponding concave portion 95. Thus, the second clutch 82 is switched from the second connection state to the second disconnection state. In the second disconnection state, the transmission of rotation between the intermediate ring 93 and the shift slider 65 is cut off. In other words, the second clutch 82 being in the second disconnection state cuts off the power transmission of the second transmission path 12.

The shift actuator 57 allows the shift slider 65 to move in the front-rear direction and to be located at any one of the front position (a position shown in FIG. 4), the intermediate position (a position shown in FIG. 3), and the rear position (a position shown in FIG. 5). When the shift slider 65 moves in the front-rear direction, the first dog clutch 52 and the second dog clutch 94 also move in the front-rear direction. Therefore, in the intermediate position, the first dog clutch 52 is located at the neutral position (the first disconnection position), and the second dog clutch 94 is located at the second connection position. In the front position, the first dog clutch 52 is located at the forward position (the first connection position), and the second dog clutch 94 is located at the front disconnection position (the second disconnection position). In the rear position, the first dog clutch 52 is located at the reverse position (the first connection position), and the second dog clutch 94 is located at the rear disconnection position (the second disconnection position).

The shift actuator 57 moves the shift slider 65 from the intermediate position to the front position. Thereupon, the plurality of front convex portions 54 of the first dog clutch 52 forwardly move to the plurality of front concave portions 53 of the front gear 50 while the plurality of convex portions 96 of the second dog clutch 94 forwardly move with respect to the plurality of concave portions 95 of the intermediate ring 93. When the shift slider 65 is located at the front position, the plurality of convex portions 96 of the second dog clutch 94 are forwardly disengaged from the plurality of concave portions 95 of the intermediate ring 93, and the plurality of front convex portions 54 of the first dog clutch 52 respectively engage with the plurality of front concave portions 53 of the front gear 50. Thus, the first clutch 81 is connected, and the second clutch 82 is disconnected.

The shift actuator 57 moves the shift slider 65 from the intermediate position to the rear position. Thereupon, the plurality of rear convex portions 55 of the first dog clutch 52 rearwardly move to the plurality of rear concave portions 56 of the rear gear 51 while the plurality of convex portions 96 of the second dog clutch 94 rearwardly move with respect to the plurality of concave portions 95 of the intermediate ring 93. When the shift slider 65 is located at the rear position, the plurality of convex portions 96 of the second dog clutch 94 are disengaged rearwardly from the plurality of concave portions 95 of the intermediate ring 93, and the plurality of rear convex portions 55 of the first dog clutch 52 engage with the plurality of rear concave portions 56 of the rear gear 51. Thus, the first clutch 81 is connected, and the second clutch 82 is disconnected.

When the shift actuator 57 moves the shift slider 65 from the front position or from the rear position to the intermediate position, the plurality of convex portions 96 of the second dog clutch 94 move to the plurality of concave portions 95 of the intermediate ring 93. Simultaneously, the plurality of front convex portions 54 of the first dog clutch 52 rearwardly move with respect to the plurality of front concave portions 53 of the front gear 50. Alternatively, the plurality of rear convex portions 55 of the first dog clutch 52 forwardly move with respect to the plurality of rear concave portions 56 of the rear gear 51. When the shift slider 65 is located at the intermediate position, the plurality of convex portions 96 of the second dog clutch 94 engage with the plurality of concave portions 95 of the intermediate ring 93, and the front convex portions 54 and the rear convex portions 55 of the first clutch are disengaged from the front concave portions 53 and the rear concave portions 56 of the first clutch, respectively. Thus, the second clutch 82 is connected, and the first clutch 81 is disconnected.

As described above, the shift device 19 including the shift actuator 57 switches the first clutch 81 from the first disconnection state to the first connection state, and switches the second clutch 82 from the second connection state to the second disconnection state. Additionally, the shift device 19 switches the first clutch 81 from the first connection state to the first disconnection state, and switches the second clutch 82 from the second disconnection state to the second connection state.

Figure 6:
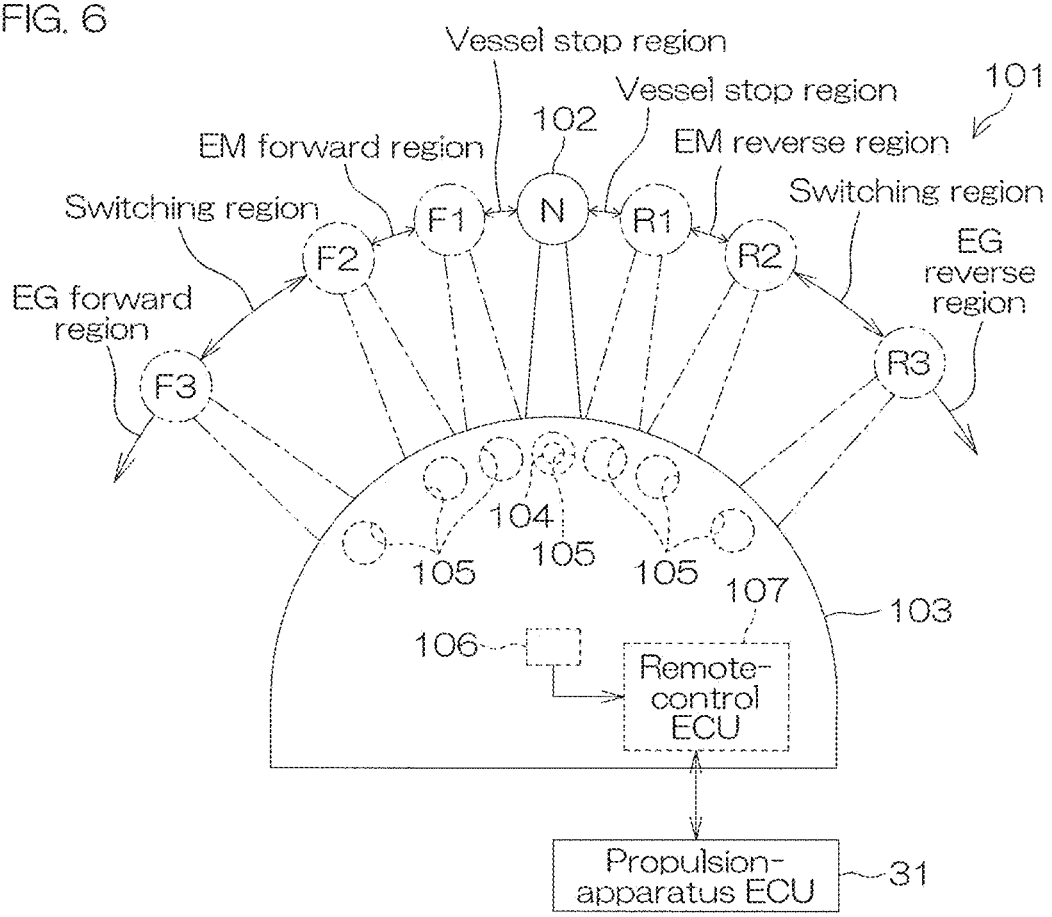
FIG. 6 is a schematic view of a remote control unit.

FIG. 6 is a schematic view of the remote control unit 101. The remote control unit 101 includes an operation lever 102 that is operated by the user and a remote control box 103 that supports a base portion of the operation lever 102 so that the operation lever 102 is able to tilt in the front-rear direction. The operation lever 102 is a throttle operation member that is operated when the output of the vessel propulsion apparatus 1 is adjusted, and is a shift operation member that is operated when switching between the forward traveling and the reverse traveling of the vessel. The remote control unit 101 may include both a throttle operation member and a shift operation member that are independent of each other instead of the operation lever 102.

The operation lever 102 is tiltable in the front-rear direction from the neutral position N. The neutral position N is an origin position at which the vessel propulsion apparatus 1 does not generate a thrust. A region that extends forwardly from the neutral position N is a forward region in which the vessel propulsion apparatus 1 forwardly propels the vessel. A region that extends rearwardly from the neutral position N is a reverse region in which the vessel propulsion apparatus 1 rearwardly propels the vessel.

The user forwardly tilts the operation lever 102 from the neutral position N, thus making it possible to place the operation lever 102 at a first forward position F1, at a second forward position F2, and at a third forward position F3 in this order and making it possible to place the operation lever 102 at a more forward position beyond the third forward position F3. A region ranging from the neutral position N to the first forward position F1 is a vessel stop region in which both the engine 8 and the electric motor 11 are stopped. A region ranging from the first forward position F1 to the second forward position F2 is an EM forward region in which the propeller 18 is rotated in the forward rotation direction only by the electric motor 11. A region ranging from the second forward position F2 to the third forward position F3 is a switching region in which the prime mover is switched between the engine 8 and the electric motor 11. A region forwardly beyond the third forward position F3 is an EG forward region in which the propeller 18 is rotated in the forward rotation direction only by the engine 8.

Likewise, the user rearwardly tilts the operation lever 102 from the neutral position N, thus making it possible to place the operation lever 102 at a first reverse position R1, at a second reverse position R2, and at a third reverse position R3 in this order and making it possible to place the operation lever 102 at a more rearward position beyond the third reverse position R3. A region ranging from the neutral position N to the first reverse position R1 is a vessel stop region in which both the engine 8 and the electric motor 11 are stopped. A region ranging from the first reverse position R1 to the second reverse position R2 is an EM reverse region in which the propeller 18 is rotated in the reverse rotation direction only by the electric motor 11. A region ranging from the second reverse position R2 to the third reverse position R3 is a switching region in which the prime mover is switched between the engine 8 and the electric motor 11. A region rearwardly beyond the third reverse position R3 is an EG reverse region in which the propeller 18 is rotated in the reverse rotation direction only by the engine 8.

When the user places the operation lever 102 at the neutral position N, a projection 104 provided on the operation lever 102 is fitted into a hollow 105 provided on the remote control box 103, and the operational resistance of the operation lever 102 is increased. When the user tilts the operation lever 102 forwardly or rearwardly from the neutral position N, the projection 104 is disengaged from the hollow 105. Thus, whether or not the operation lever 102 is in the neutral position N is sensuously transmitted to the user. The above-described hollow 105 is also provided at a position corresponding to each of the first forward position F1, the second forward position F2, the third forward position F3, the first reverse position R1, the second reverse position R2, and the third reverse position R3.

The remote control unit 101 includes a lever-position sensor 106 that detects the position of the operation lever 102. The remote control unit 101 additionally includes a remote-control ECU 107 that outputs a shift change signal that shifts the outboard motor 3 and an output change signal that changes the output of the vessel propulsion apparatus 1 to the propulsion-apparatus ECU 31 in accordance with a detection value of the lever-position sensor 106. The propulsion-apparatus ECU 31 performs switching between the forward traveling and the reverse traveling of the vessel in accordance with the position of the operation lever 102. Additionally, the propulsion-apparatus ECU 31 increases the output of the engine 8 in proportion to an increase in the amount of movement of the operation lever 102 from the neutral position N in each of the EG forward region and the EG reverse region. The propulsion-apparatus ECU 31 may increase or fix the output of the electric motor 11 in proportion to an increase in the amount of movement of the operation lever 102 from the neutral position N in each of the EM forward region and the EM reverse region.

Figure 7:
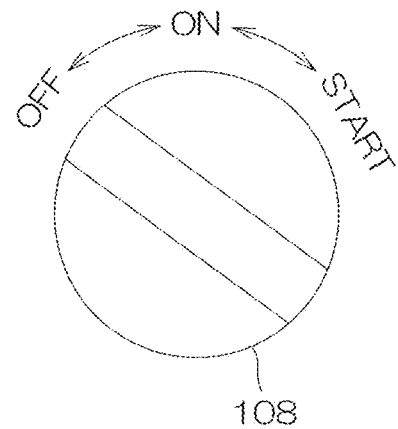
FIG. 7 is a schematic view of a starting switch.

FIG. 7 is a schematic view of the starting switch 108. The starting switch 108 is able to take any operational position, i.e., is able to take any one of an OFF position, an ON position, and a START position by being operated by the user. FIG. 7 shows an example in which the starting switch 108 is a rotary switch. Without being limited to the rotary switch, the starting switch 108 may be a push type switch or a pull type switch, or may be a switch other than these types. The ON position is a position between the OFF position and the START position. When the user releases the starting switch 108 after the starting switch 108 is moved to the START position, the starting switch 108 automatically returns to the ON position.

The OFF position is a position at which an electric circuit that connects a battery and an electric device together is cut off. The ON position is a position at which the cut-off of the electric circuit is released, and the battery and the electric device are connected together through the electric circuit. The START position is a position at which the starter motor 35 is operated, or the propulsion-apparatus ECU 31 is allowed to store the information that the operation of the starter motor 35 has been permitted. As shown in FIG. 2, the electric motor 11 is connected to a battery B1 disposed in the hull H1. Likewise, the starter motor 35 is connected to a battery B2 disposed in the hull H1. The electric motor 11 and the starter motor 35 may be connected to the same battery.

When the operation lever 102 is in the neutral position N, the user moves the starting switch 108 from the OFF position to the START position through the ON position, and, as a result, an electric circuit interposed between the electric motor 11 and the battery B1 is closed. Furthermore, a start permission command by which the start of the engine 8 is permitted is input into the propulsion-apparatus ECU 31, and the information that the start of the engine 8 has been permitted is stored in the propulsion-apparatus ECU 31. This information stored in the propulsion-apparatus ECU 31 is maintained until the starting switch 108 is located at the OFF position. The propulsion-apparatus ECU 31 allows the starter motor 35 to start the engine 8 in accordance with the position of the operation lever 102 as described below.

Figure 10:
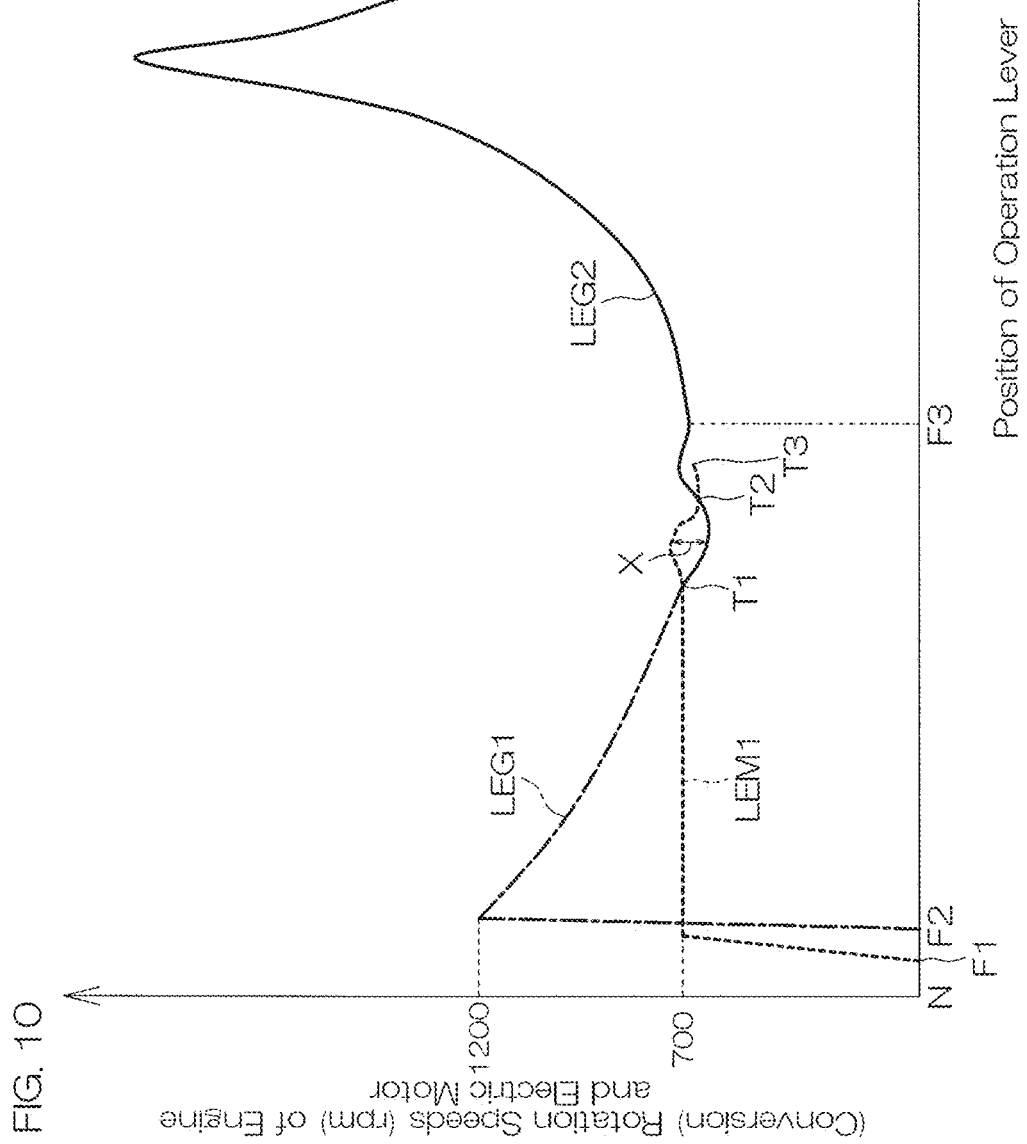
FIG. 10 is a view showing a relationship between the position of the operation lever and respective rotation speeds of both the engine and a motor.

FIG. 8 is a table that shows a relationship between the position of the operation lever 102 and operations of the engine 8, etc., when the operation lever 102 is tilted forwardly. FIG. 9 is a table that shows a relationship between the position of the operation lever 102 and operations of the engine 8, etc., when the operation lever 102 is tilted rearwardly. FIG. 10 is a view that shows a relationship between the position of the operation lever 102 and each rotation speed of both the engine 8 and the electric motor 11.

In FIG. 8 and FIG. 9, "←" represents that the operation lever 102 is moved forwardly, and "→" represents that the operation lever 102 is moved rearwardly. "EG" designates the engine 8, and "EM" designates the electric motor 11. "F," "N," and "R" of the first dog clutch 52 designate "forward position (first connection position)," "neutral position (first disconnection position)," and "reverse position (first connection position)," respectively. "ON" and "OFF" of the second dog clutch 94 designate "second connection position" and "second disconnection position," respectively.

In FIG. 10, the abscissa axis represents the position of the operation lever 102, and the ordinate axis represents each rotation speed (unit: rpm) of both the engine 8 and the electric motor 11. It should be noted that the rotation speed of the engine 8 described below is not an actual rotation speed of the engine 8, but an engine conversion rotation speed that is obtained by converting the actual rotation speed of the engine 8 into the rotation speed of the propeller shaft 17 based on the reduction ratio in the first transmission path 9. For example, the gear ratio of the pinion 49, etc., may be used as the reduction ratio. The engine conversion rotation speed is the same as or is substantially the same as the rotation speed of the front gear 50 and the rotation speed of the rear gear 51. The rotation speed (engine conversion rotation speed) of the engine 8 is shown by a thick alternate long and short dashed line LEG1 or by a thick solid line LEG2 in FIG. 10.

Likewise, the rotation speed of the electric motor 11 is not an actual rotation speed of the electric motor 11, but an electric-motor conversion rotation speed that is obtained by converting the actual rotation speed of the electric motor 11 into the rotation speed of the propeller shaft 17 based on the reduction ratio in the second transmission path 12. The electric-motor conversion rotation speed is an example of a motor conversion rotation speed. For example, the gear ratio of the second driving gear 91, etc., may be used as the reduction ratio. The electric-motor conversion rotation speed is the same as or is substantially the same as the rotation speed of the second driven gear 92 and the rotation speed of the intermediate ring 93. The rotation speed (electric-motor conversion rotation speed) of the electric motor 11 is shown by a thick broken line LEM1 and a thick broken line LEM2 in FIG. 10. Although the following description is made based on a case in which the engine conversion rotation speed and the electric-motor conversion rotation speed are both positive values, there may be a case in which one of the electric-motor conversion rotation speed and the engine conversion rotation speed may be a positive value, and the other one may be a negative value.

First, with reference to FIG. 8 and FIG. 10, a description will be provided of operations of the engine 8, etc., performed when the operation lever 102 is tilted forwardly from the neutral position N.

When the operation lever 102 is in the neutral position N, the first dog clutch 52 is located at the neutral position that is spaced apart from both the front gear 50 and the rear gear 51, and the second dog clutch 94 is located at the second connection position at which the plurality of convex portions 96 engage with the plurality of concave portions 95, respectively. Therefore, the first clutch 81 is in the first disconnection state, and the second clutch 82 is in the second connection state.

When the user forwardly moves the operation lever 102 from the neutral position N to the first forward position F1, the propulsion-apparatus ECU 31 allows the electric motor 11 to rotate in the forward rotation direction, and the electric motor 11 generates power (torque). Thus, the propeller 18 rotates in the forward rotation direction, and a thrust by which the vessel is forwardly propelled is generated.

The propulsion-apparatus ECU 31 keeps the electric-motor conversion rotation speed at a fixed value of, for example, 700 rpm while the operation lever 102 is located between the first forward position F1 and the second forward position F2. Therefore, the thrust by which the vessel is forwardly propelled is constant.

When the operation lever 102 is located at the second forward position F2, the propulsion-apparatus ECU 31 allows the starter motor 35 to start the engine 8. Thus, the rotation of the engine 8 is transmitted to the front gear 50 and the rear gear 51 through the drive shaft 15 and the pinion 49, and the front gear 50 and the rear gear 51 rotate in mutually opposite directions. Thereafter, the propulsion-apparatus ECU 31 keeps the rotation speed of the engine 8 at a low rotation speed, for example, by controlling the opening degree of the throttle valve. The rotation speed of the engine 8 at this time may be an idling rotation speed or may be a trolling rotation speed.

When the operation lever 102 is operated toward the third forward position F3, the propulsion-apparatus ECU 31 executes tuning control. More specifically, the propulsion-apparatus ECU 31 determines whether or not the absolute value of the rotation speed of the front gear 50 after the engine 8 starts is equal to or less than a first threshold value and whether or not a speed difference X showing a difference between the absolute value of the rotation speed of the front gear 50 and the absolute value of the rotation speed of the first dog clutch 52 exceeds zero and is equal to or less than a second threshold value. The first threshold value and the second threshold value are positive values, respectively. A specific value of the first threshold value is 900 rpm as an example. The second threshold value is an example of an upper limit value, and is specifically 200 rpm, for example, and is preferably 50 rpm, for example. The propeller shaft 17 rotates only by the power of the electric motor 11 at this time, and therefore the rotation speed of the first dog clutch 52 rotating together with the propeller shaft 17 is the same as or is substantially the same as the electric-motor conversion rotation speed. On the other hand, the rotation speed of the front gear 50 is the same as or is substantially the same as the engine conversion rotation speed. The tuning control in the present preferred embodiment is a control operation to reduce a difference between the absolute value of the engine conversion rotation speed and the absolute value of the electric-motor conversion rotation speed.

The rotation speed of the front gear 50 changes in accordance with the rotation speed of the engine 8. When the engine 8 is started, the rotation speed of the engine 8 temporarily increases to, for example, 1200 rpm, and yet becomes lower with the lapse of time. If the absolute value of the rotation speed of the front gear 50 exceeds the first threshold value, the propulsion-apparatus ECU 31 stands ready until the absolute value of the rotation speed of the front gear 50 becomes equal to or less than the first threshold value.

When the absolute value of the rotation speed of the front gear 50 becomes small so as to be equal to or less than the first threshold value and when the speed difference X becomes zero (see timing T1 of FIG. 10), the propulsion-apparatus ECU 31 allows the shift actuator 57 to move the shift slider 65 from the intermediate position to the front position. Thus, the second dog clutch 94 is disengaged from the intermediate ring 93, and the first dog clutch 52 starts engaging with the front gear 50.

Thereafter, the propulsion-apparatus ECU 31 controls the absolute value of the engine conversion rotation speed so as to approach the absolute value of the electric-motor conversion rotation speed, and, as a result, the speed difference X is reduced so as to have a value that exceeds zero and that is equal to or less than the second threshold value. In other words, the propulsion-apparatus ECU 31 applies tuning control to the rotation speed of the engine 8 and to the rotation speed of the electric motor 11 so that the rotation speed of the front gear 50 and the rotation speed of the first dog clutch 52 become approximately equal to each other and become different from each other when the first dog clutch 52 engages with the front gear 50. The reason why the rotation speed of the front gear 50 and the rotation speed of the first dog clutch 52 are controlled so as to become different from each other is that, if the speed difference X is zero, a state in which the front convex portion 54 of the first dog clutch 52 does not face the front concave portion 53 of the front gear 50 will be maintained, and therefore it will become difficult to fit the front convex portion 54 of the first dog clutch 52 into the front concave portion 53 of the front gear 50. Additionally, the reason why the rotation speed of the front gear 50 and the rotation speed of the first dog clutch 52 are controlled so as to become approximately equal to each other is that, if the speed difference X is large, a noise will be caused when the first dog clutch 52 engages with the front gear 50.

When the first dog clutch 52 comes to engage with the front gear 50, the speed difference X becomes zero (see timing T2 of FIG. 10). Thereafter, when the operation lever 102 reaches the third forward position F3, the shift slider 65 reaches the front position, so that the engagement between the first dog clutch 52 and the front gear 50 is completed. Therefore, the transmission of rotation from the electric motor 11 to the propeller shaft 17 is cut off, and the rotation of the engine 8 is transmitted to the propeller shaft 17 through the front gear 50 and the first dog clutch 52. In other words, the first clutch 81 is switched from the first disconnection state to the first connection state, and the second clutch 82 is switched from the second connection state to the second disconnection state.

The propulsion-apparatus ECU 31 stops the electric motor 11 at a timing at which the operation lever 102 reaches the third forward position F3 or before this timing (see timing T3 of FIG. 10). When the operation lever 102 is located at a position beyond the third forward position F3, the propulsion-apparatus ECU 31 increases the power of the engine 8 in proportion to an increase in the amount of movement of the operation lever 102 from the neutral position N, and decreases the power of the engine 8 in proportion to a decrease in the amount of movement of the operation lever 102 from the neutral position N. Thus, the rotation speed of the engine 8 is increased or decreased.

Next, a description will be provided of operations of the engine 8, etc., when the operation lever 102 is returned from the third forward position F3 to the neutral position N.

When the user moves the operation lever 102 from the third forward position F3 toward the second forward position F2, the propulsion-apparatus ECU 31 decreases the rotation speed of the engine 8, for example, by reducing the opening degree of the throttle valve. The rotation speed of the engine 8 at this time may be an idling rotation speed or may be a trolling rotation speed.

The propulsion-apparatus ECU 31 decreases the rotation speed of the engine 8, and simultaneously supplies electric power to the electric motor 11, and rotates the electric motor 11 in the forward rotation direction. The rotation of the electric motor 11 is transmitted to the second driven gear 92 and the intermediate ring 93 through the intermediate shaft 90 and the second driving gear 91.

After the electric motor 11 is started, the propulsion-apparatus ECU 31 executes tuning control. More specifically, first, the propulsion-apparatus ECU 31 determines whether or not the absolute value of the rotation speed of the intermediate ring 93 is equal to or less than a third threshold value and whether or not a speed difference Y showing a difference between the absolute value of the rotation speed of the intermediate ring 93 and the absolute value of the rotation speed of the second dog clutch 94 exceeds zero and is equal to or less than a fourth threshold value. The third threshold value and the fourth threshold value are positive values, respectively. A specific value of the third threshold value is, for example, 900 rpm, which is the same as the first threshold value, and yet may differ from the first threshold value. The fourth threshold value is specifically 200 rpm, for example, and is preferably 50 rpm, for example. The fourth threshold value may be the same as the second threshold value described above, and may differ from the second threshold value. Immediately after the electric motor 11 is started, the propeller shaft 17 is rotated only by the power of the engine 8, and therefore the rotation speed of the second dog clutch 94 rotating together with the propeller shaft 17 is the same as or is substantially the same as the engine conversion rotation speed. On the other hand, the rotation speed of the intermediate ring 93 is the same as or is substantially the same as the electric-motor conversion rotation speed.

When the absolute value of the rotation speed of the intermediate ring 93 is equal to or less than the third threshold value and when the speed difference Y becomes zero, the propulsion-apparatus ECU 31 allows the shift actuator 57 to move the shift slider 65 from the front position to the intermediate position. Thus, the first dog clutch 52 is disengaged from the front gear 50, and the second dog clutch 94 starts engaging with the intermediate ring 93 (see timing T4 of FIG. 10).

Thereafter, the propulsion-apparatus ECU 31 controls the absolute value of the engine conversion rotation speed so as to approach the absolute value of the electric-motor conversion rotation speed, and, as a result, the speed difference Y is reduced to a value that exceeds zero and that is equal to or less than the fourth threshold value. In other words, the propulsion-apparatus ECU 31 applies tuning control to the rotation speed of the engine 8 and to the rotation speed of the electric motor 11 so that the rotation speed of the intermediate ring 93 and the rotation speed of the second dog clutch 94 become approximately equal to each other and become different from each other when the second dog clutch 94 engages with the intermediate ring 93. The reason why the rotation speed of the intermediate ring 93 and the rotation speed of the second dog clutch 94 are controlled so as to become different from each other is that, if the speed difference Y is zero, a state in which the convex portion 96 of the second dog clutch 94 does not face the concave portion 95 of the intermediate ring 93 will be maintained, and therefore it will become difficult to fit the convex portion 96 into the concave portion 95. Additionally, the reason why the rotation speed of the intermediate ring 93 and the rotation speed of the second dog clutch 94 are controlled so as to become approximately equal to each other is that, if the speed difference Y is large, a noise will be caused when the second dog clutch 94 engages with the intermediate ring 93.

When the operation lever 102 reaches the second forward position F2, the shift slider 65 reaches the intermediate position, and, as a result, the engagement between the intermediate ring 93 and the second dog clutch 94 is completed. Therefore, the transmission of rotation from the engine 8 to the propeller shaft 17 is cut off, and the rotation of the electric motor 11 is transmitted to the propeller shaft 17 through the shift slider 65. In other words, the first clutch 81 is switched from the first connection state to the first disconnection state, and the second clutch 82 is switched from the second disconnection state to the second connection state.

The propulsion-apparatus ECU 31 stops the engine 8 at a timing at which the operation lever 102 reaches the second forward position F2 or before this timing (see timing T5 of FIG. 10). The propulsion-apparatus ECU 31 keeps the electric-motor conversion rotation speed at a fixed value of, for example, 700 rpm while the operation lever 102 is located between the second forward position F2 and the first forward position F1. Therefore, a thrust by which the vessel is forwardly propelled is constant. When the operation lever 102 exceeds the first forward position F1 toward the neutral position N, the propulsion-apparatus ECU 31 stops the electric motor 11.

FIG. 9 shows operations of the engine 8, etc., when the operation lever 102 is rearwardly tilted from the neutral position N and when the operation lever 102 is returned from the third reverse position R3 to the neutral position N. The operations of the engine 8, etc., shown in FIG. 9 are substantially the same as the operations of the engine 8, etc., shown in FIG. 8 except that the rotation direction of the electric motor 11 is not the forward rotation direction but the reverse rotation direction and that the first dog clutch 52 is located not at the forward position but at the reverse position. Therefore, a detailed description of FIG. 9 is omitted.

As described above, according to the structural arrangement of the present preferred embodiment, the electric motor 11 and the second transmission path 12 are housed in the lower case 24 of the outboard motor 3, and it is possible to perform power switching by using the existing forward-reverse switching mechanism 16 and the existing shift device 19. More specifically, it is possible to perform power switching between the engine 8 and the electric motor 11 in accordance with the forward-rearward movement of the shared shift rod 59 in the shift device 19. Therefore, in the hybrid vessel propulsion apparatus 1, it is possible to achieve power switching by a small, lightweight, and simple arrangement without changing the basic structure of or the size of the outboard motor 3.

In the present preferred embodiment, the second clutch 82 is switched to the second connection state when the first clutch 81 is switched to the first disconnection state. On the contrary, the first clutch 81 is switched to the first connection state when the second clutch 82 is switched to the second disconnection state. Therefore, when the engine 8 rotates the propeller shaft 17, it is possible to prevent the resistance of the electric motor 11 from being transmitted to the propeller shaft 17 or prevent the rotation of the engine 8 from being transmitted to the electric motor 11. Likewise, when the electric motor 11 rotates the propeller shaft 17, it is possible to prevent the resistance of the engine 8 from being transmitted to the propeller shaft 17. This makes it possible to efficiently use the power of the engine 8 and the power of the electric motor 11. Therefore, even in the electric motor 11 whose output is small, it is possible to easily generate a thrust while rotating the propeller shaft 17 and the propeller 18.

In the present preferred embodiment, the propulsion-apparatus ECU 31 executes the tuning control of both the engine 8 and the electric motor 11 when the shift device 19 switches the first clutch 81 between the first disconnection state and the first connection state and when the shift device 19 switches the second clutch 82 between the second connection state and the second disconnection state. During the tuning control, the propulsion-apparatus ECU 31 controls the engine 8 and the electric motor 11 so that a difference between the absolute value of the engine conversion rotation speed and the absolute value of the electric-motor conversion rotation speed becomes larger than zero and becomes equal to or less than a predetermined upper limit value (the second threshold value or the fourth threshold value described above).

The user moves the operation lever 102 from the second forward position F2 to the third forward position F3, thus performing a shift-in operation. Thereupon, the shift device 19 shifts in. In other words, the shift device 19 switches the first clutch 81 from the first disconnection state to the first connection state, and switches the second clutch 82 from the second connection state to the second disconnection state. Thus, the first dog clutch 52 is connected to the front gear 50 or to the rear gear 51 that rotates while receiving the power of the engine 8, and the second dog clutch 94 is disconnected from the second driven gear 92 that rotates while receiving the power of the electric motor 11. Thereupon, the vessel propulsion apparatus 1 enters an engine drive mode.

The user moves the operation lever 102 from the third forward position F3 to the second forward position F2, thus performing a shift-out operation. Thereupon, the shift device 19 shifts out. In other words, the shift device 19 switches the first clutch 81 from the first connection state to the first disconnection state, and switches the second clutch 82 from the second disconnection state to the second connection state. Thus, the first dog clutch 52 is disconnected from the front gear 50 and from the rear gear 51, and the second dog clutch 94 is connected to the second driven gear 92. Thereupon, the vessel propulsion apparatus 1 enters an electric motor drive mode that is an example of a motor drive mode.

As thus described, tuning control is applied to the engine 8 and to the electric motor 11 when the vessel propulsion apparatus 1 is switched from the electric motor drive mode to the engine drive mode or is switched from the engine drive mode to the electric motor drive mode. A difference between the absolute values of the rotation speeds of the front and rear gears 50 and 51 and the absolute value of the rotation speed of the second driven gear 92 is made larger than zero and equal to or less than the upper limit value by tuning control. In other words, tuning control is executed so as to reach a state in which there is substantially no difference between the absolute value of the engine conversion rotation speed and the absolute value of the electric-motor conversion rotation speed, and, in that state, the vessel propulsion apparatus 1 is switched between the engine drive mode and the electric motor drive mode. Thus, the power of the vessel propulsion apparatus 1 is switched between the engine 8 and the electric motor 11. Therefore, when power switching is performed, it is possible to reduce a shock or a noise that results from the magnitude of a difference between the engine conversion rotation speed and the electric-motor conversion rotation speed. More specifically, it is possible to reduce a shock or a noise when the first dog clutch 52 is connected to the front gear 50 or to the rear gear 51 for power switching or when the second dog clutch 94 is connected to the second driven gear 92 for power switching.

Furthermore, the propulsion-apparatus ECU 31 starts tuning control in a state in which the absolute value of the engine conversion rotation speed is larger than the absolute value of the electric-motor conversion rotation speed (see FIG. 10). Therefore, it is possible to perform power switching in a state in which the engine conversion rotation speed has been lowered in some degree after the start of tuning control, and, as a result, vibrations caused by the engine 8 have been reduced. This makes it possible to further reduce a shock or a noise caused when power switching is performed. This effect is obtained not only in a case in which the engine conversion rotation speed and the electric-motor conversion rotation speed are both positive values and in which the engine conversion rotation speed is higher than the electric-motor conversion rotation speed as described above, but also in a case in which the electric-motor conversion rotation speed is higher than the engine conversion rotation speed. The case in which the electric-motor conversion rotation speed is higher than the engine conversion rotation speed is a case in which the electric-motor conversion rotation speed is a positive value, and the engine conversion rotation speed is a negative value.

In the present preferred embodiment, the propulsion-apparatus ECU 31 executes tuning control so that the engine conversion rotation speed temporarily becomes lower than the electric-motor conversion rotation speed (see a point immediately after timing T1 and a point immediately after timing T4 of FIG. 10). According to this structural arrangement, in the tuning control, the engine conversion rotation speed decreases until the engine conversion rotation speed becomes lower than the electric-motor conversion rotation speed, and, as a result, power switching is performed in a state in which vibrations caused by the engine 8 have been reduced. Therefore, it is possible to further reduce a shock or a noise caused when power switching is performed.

In the present preferred embodiment, the propulsion-apparatus ECU 31 executes tuning control so that the engine conversion rotation speed temporarily becomes lower than the electric-motor conversion rotation speed, and then increases (see timing T1 to timing T2 of FIG. 10). According to this structural arrangement, the engine conversion rotation speed temporarily becomes lower than the electric-motor conversion rotation speed, and then increases, and, as a result, a difference between the absolute value of the engine conversion rotation speed and the absolute value of the electric-motor conversion rotation speed becomes substantially zero. In this state, power switching is performed, thus making it possible to reliably reduce a shock or a noise caused when power switching is performed.

In the present preferred embodiment, the propulsion-apparatus ECU 31 executes tuning control so that the electric-motor conversion rotation speed temporarily becomes higher than the engine conversion rotation speed, and then decreases (see timing T1 to timing T2 and timing T4 to timing T5 of FIG. 10). According to this structural arrangement, the engine conversion rotation speed becomes lower than the electric-motor conversion rotation speed, and, accordingly, the electric-motor conversion rotation speed becomes higher than the engine conversion rotation speed, and yet, thereafter, the electric-motor conversion rotation speed decreases. As a result, a difference between the absolute value of the engine conversion rotation speed and the absolute value of the electric-motor conversion rotation speed becomes substantially zero. In this state, power switching is performed, thus making it possible to reliably reduce a shock or a noise caused when power switching is performed.

In the present preferred embodiment, the propulsion-apparatus ECU 31 makes the electric-motor conversion rotation speed constant during a period until the engine conversion rotation speed decreases and temporarily coincides with the electric-motor conversion rotation speed after tuning control is started (see electric-motor conversion rotation speed before timing T1 of FIG. 10). This structural arrangement enables the propulsion-apparatus ECU 31 to easily control the absolute value of the engine conversion rotation speed so as to approach the absolute value of a constant electric-motor conversion rotation speed.

Figure 11:
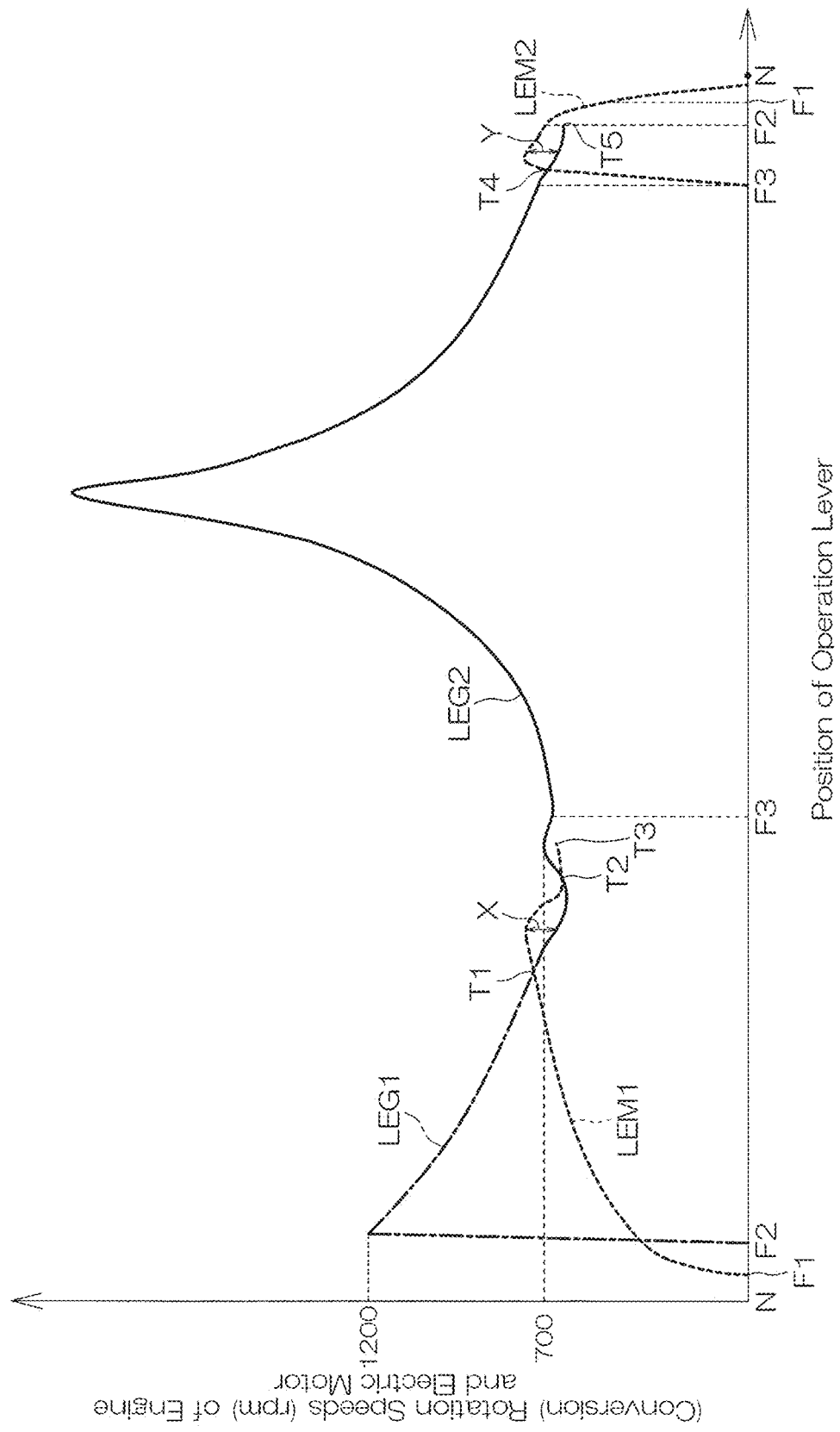
FIG. 11 is a view showing a modified relationship between the position of the operation lever and respective rotation speeds of both the engine and the motor.

FIG. 11 is a view showing a modified relationship between the position of the operation lever 102 and each rotation speed of both the engine 8 and the electric motor 11. In the above-described preferred embodiments, the rotation speed of the electric motor 11 between the first forward position F1 and the second forward position F2 is constant regardless of the amount of movement of the operation lever 102 (see FIG. 10). Additionally, the propulsion-apparatus ECU 31 performs tuning control so that the absolute value of the engine conversion rotation speed approaches the absolute value of the electric-motor conversion rotation speed. On the other hand, the rotation speed of the electric motor 11 between the first forward position F1 and the second forward position F2 increases or decreases in accordance with an increase or a decrease in the amount of movement of the operation lever 102 from the neutral position N in the modification shown in FIG. 11. Therefore, the rotation speed of the electric motor 11 increases in proportion to an increase in the amount of movement of the operation lever 102 proceeding from the first forward position F1 to the second forward position F2. Thus, the power of the electric motor 11 is increased or decreased, i.e., in other words, a thrust by which the vessel is forwardly propelled is increased or decreased. The same control is also applied to a case in which the vessel is made to travel in reverse.

In the tuning control of this modification, the propulsion-apparatus ECU 31 controls the absolute value of the electric-motor conversion rotation speed so as to approach the absolute value of the engine conversion rotation speed. Therefore, the propulsion-apparatus ECU 31 increases the electric-motor conversion rotation speed during a period until the engine conversion rotation speed decreases and temporarily coincides with the electric-motor conversion rotation speed after tuning control is started (see electric-motor conversion rotation speed before timing T1 of FIG. 11). According to this structural arrangement, the electric-motor conversion rotation speed increases while the engine conversion rotation speed decreases, and therefore a difference between the absolute value of the engine conversion rotation speed and the absolute value of the electric-motor conversion rotation speed swiftly becomes small. This makes it possible to swiftly perform power switching while reducing a shock or a noise caused when power switching is performed. Other actions and effects with respect to tuning control are also fulfilled in the tuning control of the modified relationship.

Second Preferred Embodiment

Figure 12:
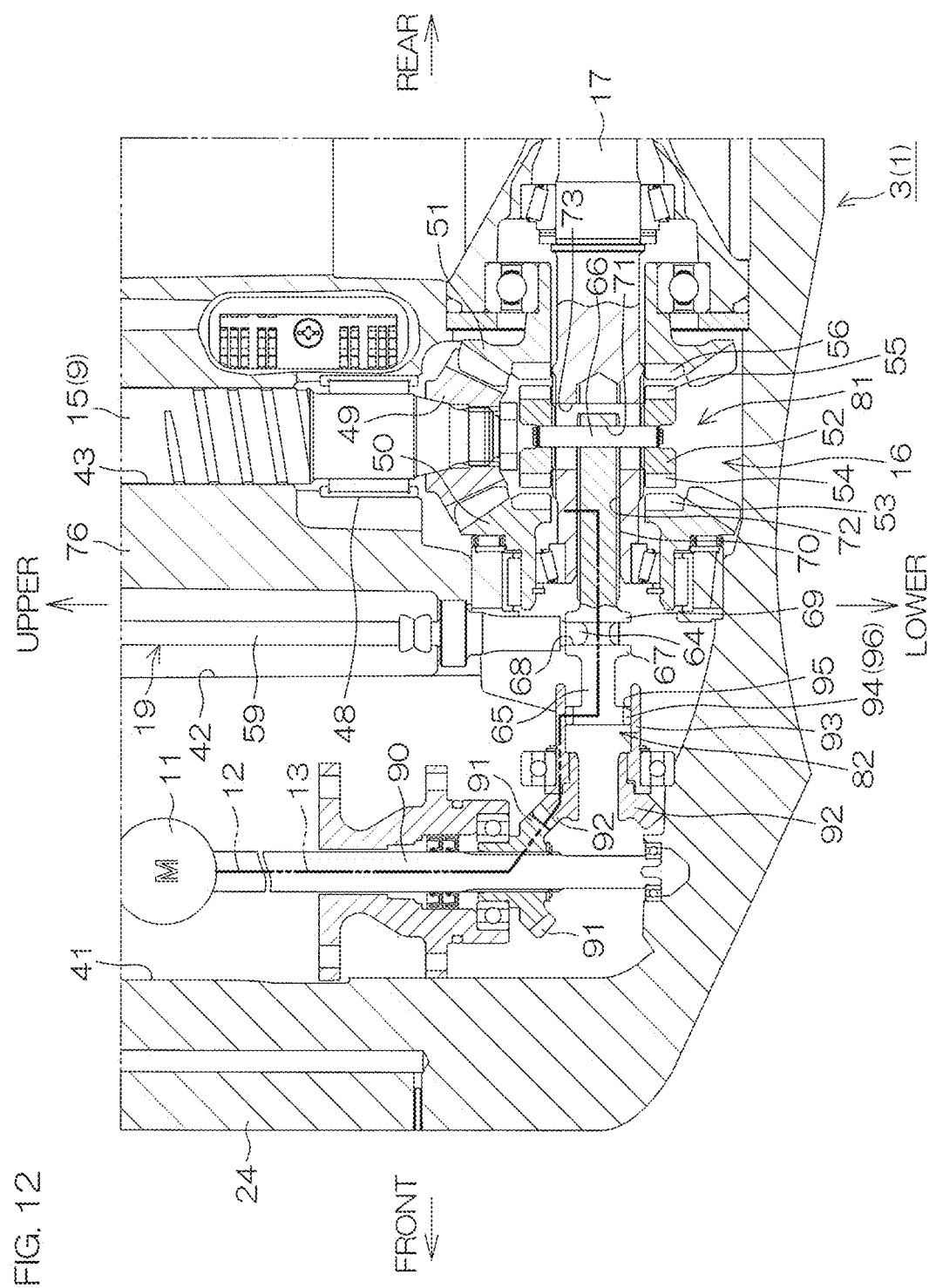
FIG. 12 is a cross-sectional view showing a portion of a vertical cross section of a lower unit of an outboard motor in a vessel propulsion apparatus according to a second preferred embodiment of the present invention.
Figure 13:
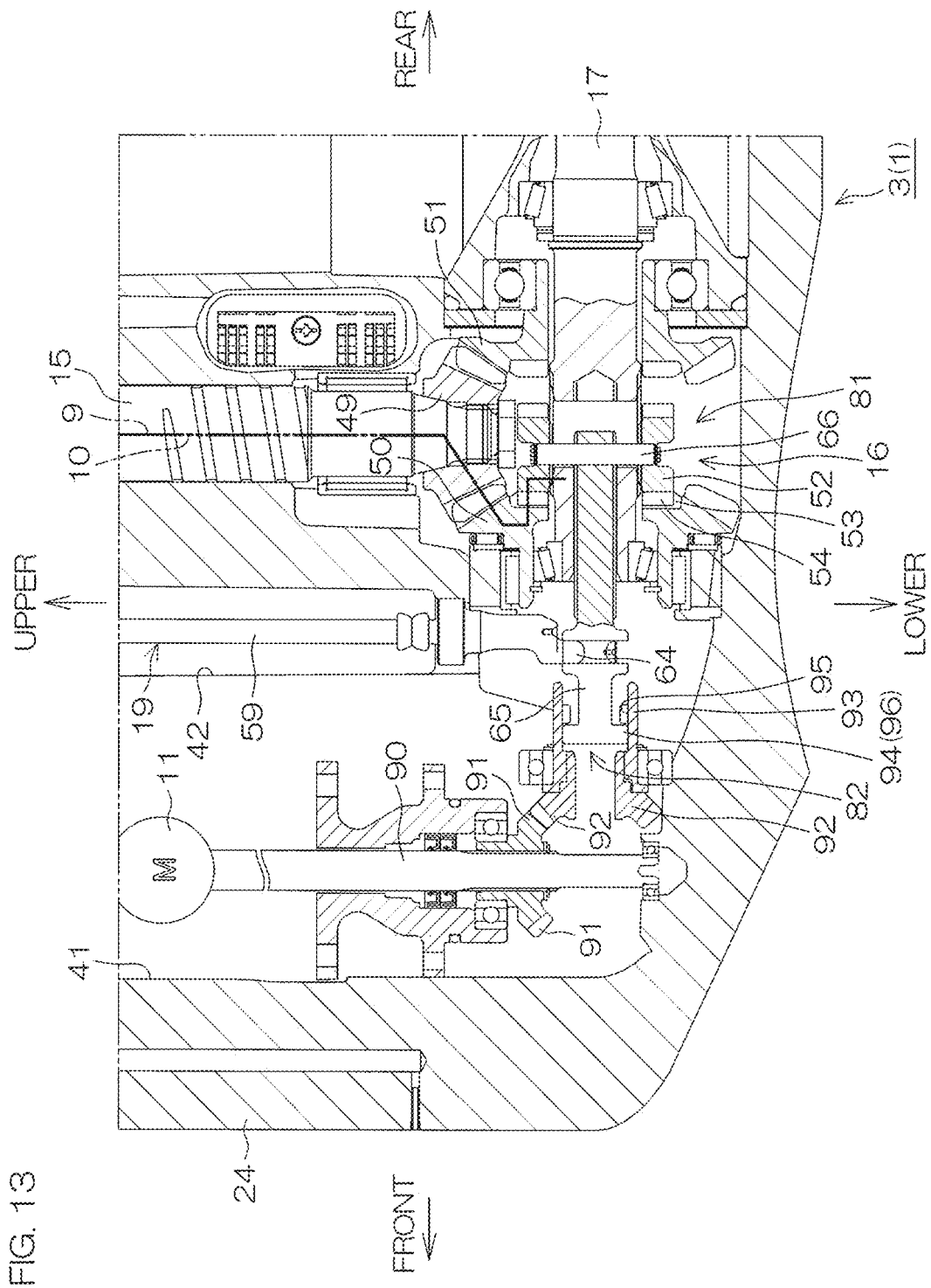
FIG. 13 is a cross-sectional view showing a portion of a vertical cross section of the lower unit of the outboard motor in the vessel propulsion apparatus according to the second preferred embodiment of the present invention.
Figure 14:
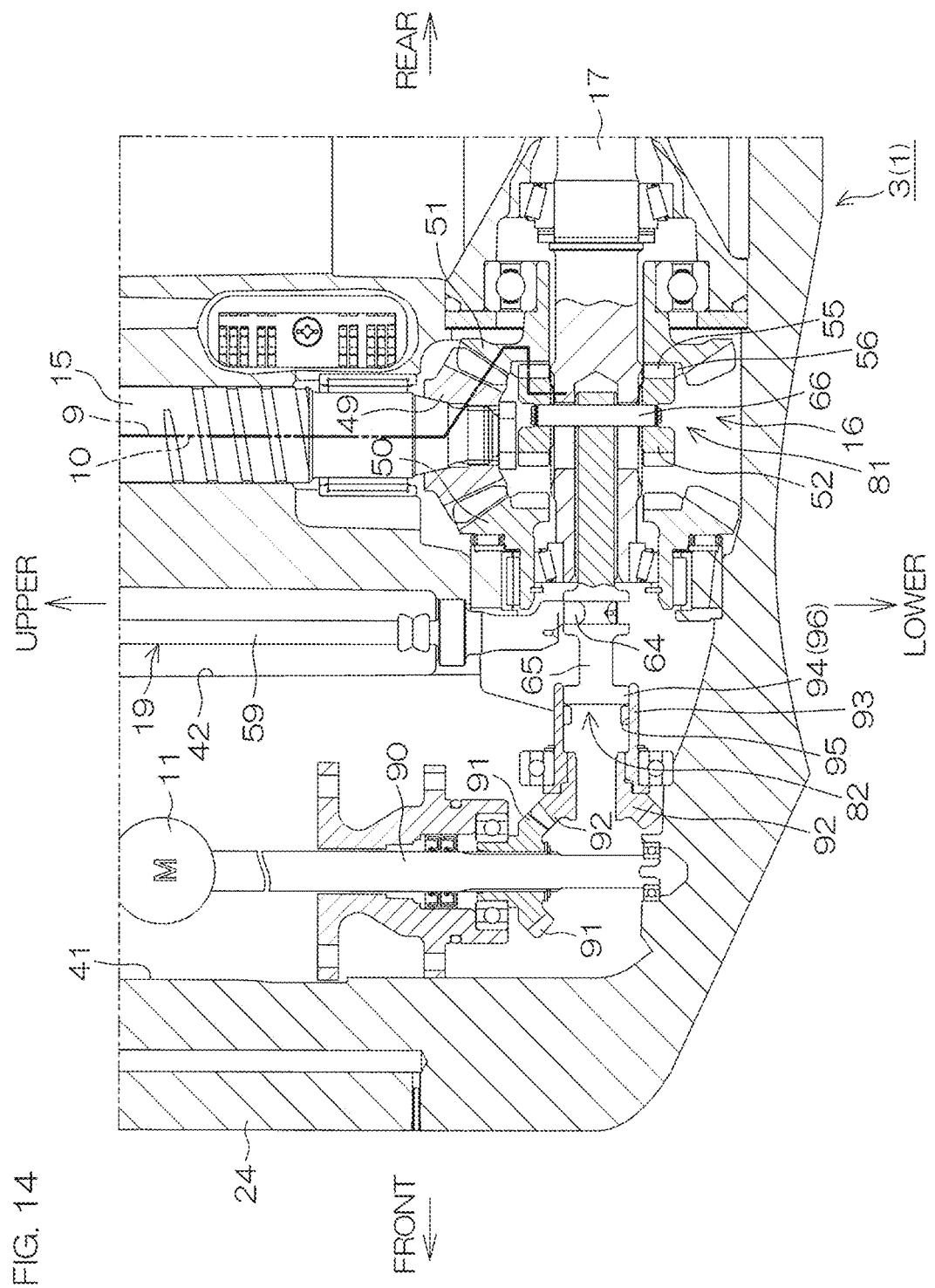
FIG. 14 is a cross-sectional view showing a portion of a vertical cross section of the lower unit of the outboard motor in the vessel propulsion apparatus according to the second preferred embodiment of the present invention.

FIG. 12 to FIG. 14 are cross-sectional views, each showing a portion of a vertical cross section of the lower unit of the outboard motor 3 in the vessel propulsion apparatus 1 according to a second preferred embodiment of the present invention. In the second preferred embodiment described below, the same reference numeral is given to a component that is functionally equivalent to each component described in the first preferred embodiment described above, and a description of the component is omitted.

In the second preferred embodiment, the shift rod 59 that is an element of the shift device 19 is located between the first transmission path 9 and the second transmission path 12 in the front-rear direction.

The shift rod 59 rotates around a rotational axis that extends in the up-down direction. The above-described pusher 64 is fixed to a lower end portion of the shift rod 59. The pusher 64 extends downwardly from the shift rod 59 at a position that deviates from the rotational axis of the shift rod 59, and is inserted in the annular groove 68 of the shift slider 65. When the shift rod 59 turns, the pusher 64 moves back and forth while turning together with the shift rod 59. Thereupon, the front facing portion 67 or the rear facing portion 69 is pushed by the pusher 64, and, as a result, the shift slider 65 moves back and forth toward the front position, or the intermediate position, or the rear position.

The convex portion 96 of the second dog clutch 94 may be provided at a front end of the shift slider 65. If so, the second driving gear 91 of the second transmission member 13 is located at a more forward position than the front end of the shift slider 65. The intermediate ring 93 is a member that differs from the second driven gear 92, and extends rearwardly from the second driven gear 92, and surrounds the front end of the shift slider 65. The above-described concave portion 95 is provided on the inner peripheral surface of the intermediate ring 93.

In a state in which the shift slider 65 is located at the intermediate position, the first dog clutch 52 is located at the neutral position and the second dog clutch 94 is located at the second connection position, and therefore the convex portion 96 of the second dog clutch 94 is fitted in the concave portion 95 of the intermediate ring 93 (see FIG. 12). Therefore, the first clutch 81 is in the first disconnection state, and the second clutch 82 is in the second connection state.

When the shift slider 65 proceeds from the intermediate position and is located at the front position, the first dog clutch 52 is located at the forward position, and the second dog clutch 94 is located at the front disconnection position, and therefore the convex portion 96 is disengaged forwardly from the concave portion 95 (see FIG. 13). Therefore, the first clutch 81 is switched from the first disconnection state to the first connection state, and the second clutch 82 is switched from the second connection state to the second disconnection state.

When the shift slider 65 recedes from the intermediate position and is located at the rear position, the first dog clutch 52 is located at the reverse position, and the second dog clutch 94 is located at the rear disconnection position, and therefore the convex portion 96 is disengaged rearwardly from the concave portion 95 (see FIG. 14). Therefore, the first clutch 81 is switched from the first disconnection state to the first connection state, and the second clutch 82 is switched from the second connection state to the second disconnection state.

Third Preferred Embodiment

Figure 15:
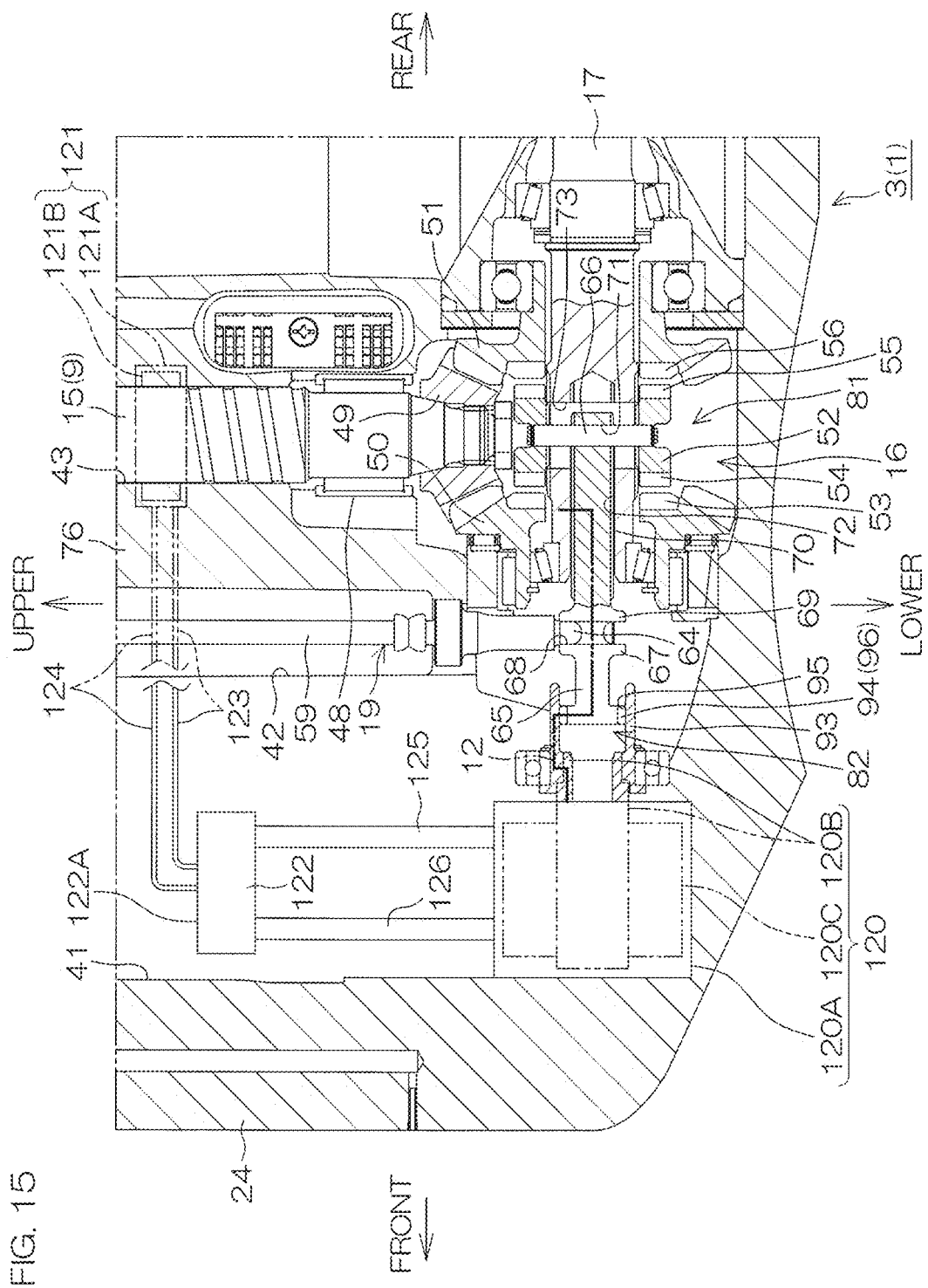
FIG. 15 is a cross-sectional view showing a portion of a vertical cross section of a lower unit of an outboard motor in a vessel propulsion apparatus according to a third preferred embodiment of the present invention.

FIG. 15 is a cross-sectional view showing a portion of a vertical cross section of the lower unit of the outboard motor 3 in the vessel propulsion apparatus 1 according to a third preferred embodiment of the present invention. In the third preferred embodiment described below, the same reference numeral is given to a component that is functionally equivalent to each component described in the first and second preferred embodiments described above, and a description of the component is omitted. FIG. 15 shows a state in which the above-described shift slider 65 is located at the intermediate position.

In the third preferred embodiment, an oil motor 120 shown in FIG. 15 is used instead of the electric motor 11 in the arrangement of the second preferred embodiment. The oil motor 120 has a cylindrical casing 120A that is disposed in front of the intermediate ring 93 in the motor chamber 41, an output shaft 120B that protrudes rearwardly from the casing 120A, and an impeller 120C that is connected to the output shaft 120B in the casing 120A. The output shaft 120B is disposed coaxially with the intermediate ring 93, and is connected to the intermediate ring 93 rotatably together with the intermediate ring 93. The shift slider 65 and the intermediate ring 93 are elements of the above-described second transmission path 12. The output shaft 120B and the intermediate ring 93 may be connected by the second driving gear 91 and the second driven gear 92 in the same way as in the second preferred embodiment. In this case, the intermediate ring 93 may be regarded as a portion of the second driven gear 92. Additionally, various known hydraulic motors may be employed as the oil motor 120 besides an arrangement that uses the impeller 120C.

With respect to the oil motor 120, the outboard motor 3 includes an oil pump 121, an oil controller unit 122, and an outflow passage 123 and an inflow passage 124 by each of which the oil pump 121 and the oil controller unit 122 are connected together. The outboard motor 3 additionally includes a first flow passage 125 and a second flow passage 126 by each of which the oil motor 120 and the oil controller unit 122 are connected together.

The oil pump 121 includes a casing 121A that houses a portion of the drive shaft 15 and an impeller 121B that is disposed in the casing 121A and that is rotatable together with the drive shaft 15. The oil controller unit 122 includes a casing 122A and a multi-way valve (not shown) disposed in the casing 122A. The opening and closing of the multi-way valve is controlled by the propulsion-apparatus ECU 31 (see FIG. 2).

Oil to operate the oil motor 120 is stored in the casing 120A, the casing 121A, the casing 122A, the outflow passage 123, the inflow passage 124, the first flow passage 125, and the second flow passage 126. An oil tank (not shown) may be separately provided so that oil is supplied from the oil tank to the outflow passage 123 or to the inflow passage 124 or so that oil is collected in the oil tank.

The impeller 121B of the oil pump 121 rotates while the drive shaft 15 rotates in accordance with the driving of the engine 8. Thus, oil circulates in such a way as to flow out from the casing 121A of the oil pump 121 to the outflow passage 123, and then flow through the inside of the casing 122A of the oil controller unit 122, and return from the inflow passage 124 to the casing 121A.

The multi-way valve of the oil controller unit 122 is controlled so that oil flows out from the casing 122A to the first flow passage 125, and flows into the casing 122A from the second flow passage 126. Thereupon, a portion of the oil circulating between the oil pump 121 and the oil controller unit 122 flows in such a way as to flow out from the casing 122A to the first flow passage 125, and then flow through the inside of the casing 120A of the oil motor 120, and return from the second flow passage 126 to the casing 122A. Thus, the impeller 120C disposed in the casing 120A rotates in, for example, the forward rotation direction together with the output shaft 120B. In this case, the propeller shaft 17 and the propeller 18 rotate in the forward rotation direction only by the driving force of the oil motor 120 if the first clutch 81 is in the first disconnection state and the second clutch 82 is in the second connection state as shown in FIG. 15. At this time, the vessel propulsion apparatus 1 is in a pump-motor drive mode that is an example of the motor drive mode.

On the other hand, the multi-way valve of the oil controller unit 122 is controlled so that oil flows out from the casing 122A to the second flow passage 126, and then flows into the casing 122A from the first flow passage 125. Thereupon, a portion of the oil circulating between the oil pump 121 and the oil controller unit 122 flows reversely in such a way as to flow out from the casing 122A to the second flow passage 126, and then flow through the inside of the casing 120A of the oil motor 120, and return from the first flow passage 125 to the casing 122A. Thus, the impeller 120C disposed in the casing 120A rotates in, for example, the reverse rotation direction together with the output shaft 120B. In this case, the propeller shaft 17 and the propeller 18 rotate in the reverse rotation direction only by the driving force of the oil motor 120 if the first clutch 81 is in the first disconnection state, and the second clutch 82 is in the second connection state as shown in FIG. 15. At this time, the vessel propulsion apparatus 1 is also in the pump-motor drive mode.

In the third preferred embodiment, the oil-motor conversion rotation speed that corresponds to the electric-motor conversion rotation speed described above is obtained by converting an actual rotation speed of the oil motor 120 into the rotation speed of the propeller shaft 17 based on the reduction ratio in the second transmission path 12. It should be noted that, if the output shaft 120B of the oil motor 120 is connected directly to the intermediate ring 93 as shown in FIG. 15, the oil-motor conversion rotation speed is an actual rotation speed of the output shaft 120B, and is equal or substantially equal to the rotation speed of the intermediate ring 93. Additionally, the propulsion-apparatus ECU 31 is capable of adjusting the pump-motor conversion rotation speed, for example, by adjusting the opening degree of a corresponding valve in the multi-way valve of the oil controller unit 122.

Switching between the first disconnection state and the first connection state of the first clutch 81 and switching between the second connection state and the second disconnection state of the second clutch 82 are performed in the same way as in the first and second preferred embodiments. More specifically, not based on the electric-motor conversion rotation speed but based on the oil-motor conversion rotation speed and on the engine conversion rotation speed, the above-described tuning control is applied to the engine 8 and to the oil motor 120 in the third preferred embodiment. Thus, the vessel propulsion apparatus 1 is switched between the pump-motor drive mode and the engine drive mode. The oil motor 120 is capable of generating an initial torque more swiftly than the electric motor 11, and therefore, in the third preferred embodiment, it is possible to be more responsive in the EM forward region and in the EM reverse region (see FIG. 6) than in the second preferred embodiment. In the third preferred embodiment, "EM" that designates an electric motor is ignored in the terms of the EM forward region, the EM reverse region, etc., described above.

Although preferred embodiments of the present invention have been described above, the present invention is not restricted to the contents of these preferred embodiments and various modifications are possible within the scope of the present invention.

The first forward position F1 and the first reverse position R1 (see FIG. 6) may be omitted. If so, a dead zone between the first forward position F1 and the first reverse position R1 is omitted. Thus, when the user moves the operation lever 102 forwardly or rearwardly from the neutral position N, the propulsion-apparatus ECU 31 allows the starter motor 35 to immediately start the engine 8. At this time, the electric motor 11 and the oil motor 120 are in a stopped state. Thereafter, when the user moves the operation lever 102 to the second forward position F2 or to the second reverse position R2, the propulsion-apparatus ECU 31 rotates the electric motor 11 and the oil motor 120, so that the vessel is propelled forwardly or rearwardly. While the user is moving the operation lever 102 to the third forward position F3 or to the third reverse position R3, the propulsion-apparatus ECU 31 switches the power from the electric motor 11 or from the oil motor 120 to the engine 8 as described above. Therefore, when the user moves the operation lever 102 beyond the third forward position F3 or beyond the third reverse position R3, the vessel is propelled only by the power of the engine 8. Thereafter, when the user moves the operation lever 102 toward the second forward position F2 or toward the second reverse position R2, the propulsion-apparatus ECU 31 switches the power from the engine 8 to the electric motor 11 or to the oil motor 120. When the user moves the operation lever 102 from the second forward position F2 or from the second reverse position R2 toward the neutral position N, the propulsion-apparatus ECU 31 stops the engine 8 and the electric motor 11 (or the oil motor 120). In this case, the above-described tuning control is likewise executed when power switching is performed, thus making it possible to reduce a shock or a noise.

Tuning control may be executed in either one of shift-in and shift-out although tuning control is executed in both shift-in and shift-out in the above-described preferred embodiments.

In the second transmission member 13, the deceleration mechanism that decelerates and transmits the rotation of the electric motor 11 may be excluded. If so, the above-described intermediate shaft 90 may be an output shaft of the electric motor 11. The same applies to the oil motor 120.

The shift device 19 may be a mechanical type (hydraulic type or cable type) that does not include the shift actuator 57.

The vessel propulsion apparatus 1 may include an inboard/outboard motor instead of the outboard motor 3.

Two or more features may be combined together in the features described in the first, second, and third preferred embodiments and in the features described in the above-described modifications.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hybrid type vessel propulsion apparatus comprising:
   an engine;
   a motor;
   a propeller shaft that rotates together with a propeller;
   a first transmission path that transmits power of the engine to the propeller shaft;
   a second transmission path that transmits power of the motor to the propeller shaft without transmitting the power of the motor through the first transmission path;
   a first clutch including a first disconnection state in which power transmission of the first transmission path is cut off and a first connection state in which the power transmission of the first transmission path is permitted;
   a second clutch including a second disconnection state in which power transmission of the second transmission path is cut off and a second connection state in which the power transmission of the second transmission path is permitted;
   a switch that switches the first clutch from the first disconnection state to the first connection state and switches the second clutch from the second connection state to the second disconnection state, or that switches the first clutch from the first connection state to the first disconnection state and switches the second clutch from the second disconnection state to the second connection state; and
   a controller configured or programmed to execute tuning control of both the engine and the motor so that a difference between an absolute value of an engine conversion rotation speed that is obtained by converting a rotation speed of the engine into a rotation speed of the propeller shaft and an absolute value of a motor conversion rotation speed that is obtained by converting a rotation speed of the motor into the rotation speed of the propeller shaft becomes larger than zero and becomes equal to or less than a predetermined upper limit value when the switch switches the first clutch between the first disconnection state and the first connection state and switches the second clutch between the second connection state and the second disconnection state; wherein the controller is configured or programmed to start the tuning control in a state in which the absolute value of the engine conversion rotation speed is larger than the absolute value of the motor conversion rotation speed.

2. The hybrid type vessel propulsion apparatus according to claim 1, wherein the controller is configured or programmed to execute the tuning control when the switch switches the first clutch from the first disconnection state to the first connection state, and switches the second clutch from the second connection state to the second disconnection state.

3. The hybrid type vessel propulsion apparatus according to claim 1, wherein the controller is configured or programmed to execute the tuning control when the switch switches the first clutch from the first connection state to the first disconnection state, and switches the second clutch from the second disconnection state to the second connection state.

4. The hybrid type vessel propulsion apparatus according to claim 1, wherein the controller is configured or programmed to execute the tuning control so that the engine conversion rotation speed temporarily becomes lower than the motor conversion rotation speed.

5. The hybrid type vessel propulsion apparatus according to claim 4, wherein the controller is configured or programmed to execute the tuning control so that the engine conversion rotation speed temporarily becomes lower than the motor conversion rotation speed, and then increases.

6. The hybrid type vessel propulsion apparatus according to claim 4, wherein the controller is configured or programmed to execute the tuning control so that the motor conversion rotation speed temporarily becomes higher than the engine conversion rotation speed, and then decreases.

7. The hybrid type vessel propulsion apparatus according to claim 1, wherein the controller is configured or programmed to keep the motor conversion rotation speed constant during a period until the engine conversion rotation speed decreases and temporarily coincides with the motor conversion rotation speed after the tuning control is started.

8. The hybrid type vessel propulsion apparatus according to claim 1, wherein the controller is configured or programmed to increase the motor conversion rotation speed during a period until the engine conversion rotation speed decreases and temporarily coincides with the motor conversion rotation speed after the tuning control is started.

9. The hybrid type vessel propulsion apparatus according to claim 1, wherein the first transmission path includes a first driving gear that rotates in accordance with rotation of the engine and a first driven gear that is rotationally driven by the first driving gear;

the first clutch includes a first dog clutch that is movable in an axial direction of the propeller shaft between a first disconnection position disengaged from the first driven gear and a first connection position engaged with the first driven gear and that rotates together with the propeller shaft;

the first clutch is in the first disconnection state when the first dog clutch is located at the first disconnection position, and the first clutch is in the first connection state when the first dog clutch is located at the first connection position;

the second transmission path includes a second driving gear that rotates in accordance with rotation of the motor and a second driven gear that is rotationally driven by the second driving gear;

the second clutch includes a second dog clutch that is movable in the axial direction between a second disconnection position disengaged from the second driven gear and a second connection position engaged with the second driven gear and that rotates together with the propeller shaft;

the second clutch is in the second disconnection state when the second dog clutch is located at the second disconnection position, and the second clutch is in the second connection state when the second dog clutch is located at the second connection position;

the switch includes a shift actuator that moves the first dog clutch and the second dog clutch in the axial direction;

the engine conversion rotation speed is equal or substantially equal to a rotation speed of the first driven gear; and the motor conversion rotation speed is equal to or substantially equal to a rotation speed of the second driven gear.

10. The hybrid type vessel propulsion apparatus according to claim 1, wherein the motor is an electric motor.

11. The hybrid type vessel propulsion apparatus according to claim 1, wherein the motor is an oil motor.

* * * * *